United States Patent
Hayakawa

(10) Patent No.: US 8,028,310 B2
(45) Date of Patent: Sep. 27, 2011

(54) OPTICAL PICKUP AND DISK DRIVE DEVICE

(75) Inventor: Satoshi Hayakawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 237 days.

(21) Appl. No.: 12/434,035

(22) Filed: May 1, 2009

(65) Prior Publication Data

US 2009/0303844 A1   Dec. 10, 2009

(30) Foreign Application Priority Data

Jun. 9, 2008 (JP) .................................. 2008-150412

(51) Int. Cl.
G11B 7/004 (2006.01)
(52) U.S. Cl. .................. 720/683; 369/44.16; 369/112.23
(58) Field of Classification Search ............ 369/112.23, 369/112.01, 13.02, 44.16; 720/663, 683; 360/256.2, 264.5, 266.8
See application file for complete search history.

(56) References Cited

U.S. PATENT DOCUMENTS

| | | | | |
|---|---|---|---|---|
| 5,579,295 | A * | 11/1996 | Van Rosmalen | 720/683 |
| 6,741,543 | B1 * | 5/2004 | Suzuki et al. | 720/683 |
| 2003/0016597 | A1 * | 1/2003 | Haruguchi et al. | 369/44.16 |
| 2003/0026191 | A1 * | 2/2003 | Suzuki et al. | 369/244 |
| 2003/0198148 | A1 * | 10/2003 | Choi | 369/44.16 |
| 2004/0022168 | A1 * | 2/2004 | Kawano et al. | 369/244 |
| 2006/0143640 | A1 * | 6/2006 | Choi et al. | 720/683 |
| 2006/0225087 | A1 * | 10/2006 | Shimokawa et al. | 720/683 |
| 2007/0147197 | A1 * | 6/2007 | Huang et al. | 369/44.15 |
| 2008/0123202 | A1 * | 5/2008 | Bammert et al. | 359/824 |

FOREIGN PATENT DOCUMENTS

| JP | 10-334486 | 12/1998 |
|---|---|---|
| JP | 2001-222830 | 8/2001 |
| JP | 2006-202380 | 8/2006 |
| JP | 2006-294157 | 10/2006 |
| JP | 2007-149303 | 6/2007 |
| JP | 2007-149310 | 6/2007 |

OTHER PUBLICATIONS

Office Action issued Aug. 19, 2010 in JP Application No. 2008-150412.

* cited by examiner

*Primary Examiner* — Wayne Young
*Assistant Examiner* — Thomas Alunkal
(74) *Attorney, Agent, or Firm* — Oblon, Spivak, McClelland, Maier & Neustadt, L.L.P.

(57) ABSTRACT

An optical pickup includes a moving base moved in a radial direction of a disk-like recording medium mounted on a disk table, and an objective lens drive device disposed on the base and including an objective lens. The drive device includes a fixed block fixed to the base, a movable block including the lens and a lens holder and moved in focusing and tracking directions, supporting springs connecting the fixed and movable blocks, focusing magnets moving the movable block in the focusing direction, tracking magnets moving the movable block in the tracking direction and each having two magnetized poles, focusing coils facing the focusing magnets, and tracking coils facing the tracking magnets and spaced apart in the tracking direction. The north and south poles of the tracking magnet are adjacent in the tracking direction. The boundary between the poles is formed by a line segment not being one straight line.

5 Claims, 16 Drawing Sheets

OPTICAL PICKUP AND DISK DRIVE DEVICE

BACKGROUND OF THE INVENTION

1. Field of the Invention

The present invention relates to an optical pickup and a disk drive device. Specifically, the present invention relates to a technical field of forming the boundary between the north and south poles of a tracking magnet by using an arbitrary line segment not being one straight line, to thereby suppress the generation of unnecessary torque in a tracking operation and a focusing operation and improve the transmission characteristic.

2. Description of the Related Art

There is a disk drive device which records and reproduces an information signal on and from a disk-like recording medium such as an optical disk and a magnetooptical disk. Such a disk drive device is provided with an optical pickup which is moved in the radial direction of the disk-like recording medium to apply laser light to the disk-like recording medium.

The optical pickup is provided with an objective lens drive device which includes a fixed block and a movable block supported by the fixed block via a plurality of supporting springs made of metal wire or the like (see Japanese Unexamined Patent Application Publication No. 2006-202380, for example).

In the optical pickup, the movable block including a lens holder for holding an objective lens is moved with respect to the fixed block in a focusing direction, which corresponds to a direction approaching or separating from a recording surface of the disk-like recording medium, to perform focus adjustment. Further, the movable block is moved with respect to the fixed block in a tracking direction, which substantially corresponds to the radial direction of the disk-like recording medium, to perform tracking adjustment. With the focus adjustment and the tracking adjustment described above, the spot of the laser light applied to the disk-like recording medium via the objective lens is collected on a recording track of the disk-like recording medium.

The objective lens drive device provided to the optical pickup is provided with a focusing magnetic circuit for moving the movable block in the focusing direction and a tracking magnetic circuit for moving the movable block in the tracking direction. The focusing magnetic circuit includes focusing coils and focusing magnets. The tracking magnetic circuit includes tracking coils and tracking magnets.

In the objective lens drive device, the movable block and the fixed block are connected to each other by the supporting springs, while being apart from each other in a tangential direction perpendicular to both the focusing direction and the tracking direction.

When the optical pickup is moved in the radial direction of the disk-like recording medium, the laser light is transmitted through an optical path opening formed in a surface of the lens holder opposite to a surface thereof facing the fixed block, and is incident on an upward reflecting mirror disposed below the objective lens. The laser light reflected by the upward reflecting mirror is applied to the recording surface of the disk-like recording medium via the objective lens. In this process, the focus adjustment and the tracking adjustment described above are performed such that the spot of the laser light applied to the disk-like recording medium via the objective lens is collected on the recording track of the disk-like recording medium.

The objective lens drive device includes an objective lens drive device in which symmetrical magnetic circuits are provided on both sides of the objective lens in the tangential direction. In this type of objective lens drive device, it is necessary to provide one of the magnetic circuits at a position shifted from the optical path opening. Therefore, the thickness (height) of the movable block is increased, and there arises an issue of difficulty in slimming down the objective lens drive device.

Meanwhile, the objective lens drive device includes another type of objective lens drive device in which the magnetic circuit is provided only on the fixed block side of the movable block. In this type of objective lens drive device, the upward reflecting mirror is disposed at a height substantially the same as the position (height) of the magnetic circuit provided on the fixed block side of the movable block. Therefore, the objective lens drive device is slimmed down.

However, the objective lens included in the movable block has a large weight. In the objective lens drive device provided with the magnetic circuit only on the fixed block side of the movable block, therefore, it is necessary to provide a balancer on the opposite side of the objective lens across the magnetic circuit to set the centroid of the movable block in the vicinity of the magnetic circuit. In this type of objective lens drive device provided with the magnetic circuit only on the fixed block side of the movable block, therefore, the provided balancer increases the weight of the movable block, and causes a decrease in sensitivity in the movement of the movable block.

Further, in this type of objective lens drive device provided with the magnetic circuit only on the fixed block side of the movable block, the objective lens, the magnetic circuit, and the balancer are sequentially provided in the tangential direction. Therefore, the length in the tangential direction of the movable block is increased, and the high-order resonance characteristic is deteriorated.

In view of the above, there is an objective lens drive device in which the centroid of the movable block is positioned to be closer to the objective lens than to the magnetic circuit to improve the sensitivity and the high-order resonance characteristic while slimming down the objective lens drive device (see FIG. 13).

SUMMARY OF THE INVENTION

However, as illustrated in FIG. 13, in the objective lens drive device in which the centroid of the movable block is positioned to be closer to the objective lens than to the magnetic circuit, if thrust forces Ft acting in the tracking direction are generated in respective tracking coils b of a movable block a, a point of application P of the resultant force of the thrust forces Ft does not match the centroid G. Thus, torque acting around an axis passing through the centroid G and extending in the focusing direction (Z-axis) is generated. Due to the generation of the torque, therefore, there arises an issue of deterioration of the transmission characteristic.

The generation of the torque acting around the Z-axis will be described in detail below (see FIG. 14). Due to magnetic fields J generated around respective tracking magnets c, thrust forces are generated in the tracking coils b. In each of the tracking magnets c, two poles of north and south poles are magnetized and located adjacent to each other in the tracking direction with a boundary s interposed therebetween.

It is now assumed that the thrust forces generated in one of the tracking coils b in the tracking direction are represented as thrust forces Ft11 and Ft12, and that the thrust forces generated in the other one of the tracking coils b in the tracking direction are represented as thrust forces Ft21 and Ft22. In this case, the magnitudes and directions of the thrust forces Ft11, Ft12, Ft21, and Ft22 depend on the intensities and directions of the magnetic fields J, and thus are different from one another.

The respective thrust forces generated in the tracking coils b correspond to a combined thrust force Ft13 combining the thrust forces Ft11 and Ft12 and a combined thrust Ft23 combining the thrust forces Ft21 and Ft22. The force generated in a tracking magnetic circuit corresponds to a combined thrust force Ft4 combining the combined thrust forces Ft13 and Ft23.

The point of application P of the combined thrust force Ft4 is located at a position apart from the centroid G by a distance d in the tangential direction. In the movable block a, therefore, torque acting around the Z-axis is generated which has a magnitude corresponding to the product of the distance d between the centroid G and the point of application P multiplied by the combined thrust force Ft4.

Meanwhile, as well as the above-described torque acting around the Z-axis, torque acting around an axis extending in the tangential direction (X-axis) is also generated in the objective lens drive device. The issue of deterioration of the transmission characteristic also arises when the torque acting around the X-axis is generated.

The generation of the torque acting around the X-axis will be described in detail below (see FIGS. 15 and 16). The X-axis extends in the tangential direction and passes through the midpoint between the tracking magnets c located on a line connecting the respective centers of the tracking coils b. The torque acting around the X-axis can be generated when the movable block a is moved in the focusing direction.

When the movable block a is located at a neutral position in the focusing direction (see FIG. 15), thrust forces Pt1, Pt2, and so forth (only Pt1 to Pt6 are illustrated in the drawing) and thrust forces Qt1, Qt2, and so forth (only Qt1 to Qt6 are illustrated in the drawing), which are generated in respective areas of the tracking coils b by the magnetic fields J generated around the tracking magnets c, are balanced between the two tracking coils b. Therefore, the torque acting around the X-axis is not generated.

If the movable block a is moved in the focusing direction, an upper (or lower) end portion of each of the tracking coils b shifts from the position facing the corresponding tracking magnet c, as illustrated in FIG. 16. Therefore, the balance of the thrust forces is lost between the two tracking coils b. As a result, the directions and magnitudes of the thrust forces become different between the two tracking coils b, and the torque acting around the X-axis is generated.

In view of the above, an optical pickup and a disk drive device according to an embodiment of the present invention address the above-described issues. In the optical pickup and the disk drive device, it is desirable to suppress the generation of unnecessary torque in the tracking operation and the focusing operation and improve the transmission characteristic.

To address the above-described issues, an optical pickup according to an embodiment of the present invention includes a moving base moved in a radial direction of a disk-like recording medium mounted on a disk table, and an objective lens drive device disposed on the moving base and including an objective lens. The objective lens drive device includes a fixed block, a movable block, a plurality of supporting springs, focusing magnets, tracking magnets, focusing coils, and a pair of tracking coils. The fixed block is fixed to the moving base. The movable block includes the objective lens and a lens holder holding the objective lens, and is moved with respect to the fixed block at least in a focusing direction corresponding to a direction approaching or separating from a recording surface of the disk-like recording medium and a tracking direction substantially corresponding to the radial direction of the disk-like recording medium. The plurality of supporting springs are configured to connect the fixed block and the movable block. The focusing magnets are configured to move the movable block in the focusing direction. The tracking magnets are configured to move the movable block in the tracking direction, and each of the tracking magnets has two magnetized poles. The focusing coils are positioned to face the focusing magnets. The pair of tracking coils are positioned to face the tracking magnets and to be apart from each other in the tracking direction. North and south poles of each of the tracking magnets are positioned to be adjacent to each other in the tracking direction. A boundary between the north and south poles of the tracking magnet is formed by an arbitrary line segment not being one straight line.

In the optical pickup, therefore, the generation of unnecessary torque is suppressed in the tracking operation and the focusing operation, and the transmission characteristic can be improved.

In the above-described optical pickup, it is desirable that, when the tracking magnet is halved by a centerline thereof in the focusing direction, each of the north and south poles of the tracking magnet has a line-symmetrical shape with respect to the centerline.

With each of the north and south poles formed into a line-symmetric shape with respect to the centerline, when the movable block is moved in the focusing direction, the suppressed state of the torque is not changed in accordance with the direction of the movement. Therefore, unnecessary torque can be suppressed irrespective of the direction of the movement.

Further, in the above-described optical pickup, it is desirable that the tracking magnet is formed by at least two members connected in the focusing direction.

With the tracking magnet formed by at least two members connected in the focusing direction, a part of the complicated boundary is formed by a connected portion of the members. Therefore, the tracking magnet having the complicated boundary can be easily formed.

Further, in the above-described optical pickup, it is desirable that the boundary between the north and south poles of the tracking magnet is formed by two consecutive straight lines tilted with respect to the focusing direction.

With the boundary between the north and south poles of the tracking magnet formed by two consecutive straight lines tilted with respect to the focusing direction, the configuration of the boundary is simplified. Therefore, the production of the tracking magnet can be simplified.

To address the above-described issues, a disk drive device according to an embodiment of the present invention includes a disk table on which a disk-like recording medium is mounted, and an optical pickup which includes a moving base moved in a radial direction of the disk-like recording medium mounted on the disk table and an objective lens drive device disposed on the moving base and including an objective lens, and which is configured to apply laser light to the disk-like recording medium mounted on the disk table via the objective lens. The objective lens drive device includes a fixed block, a movable block, a plurality of supporting springs, focusing magnets, tracking magnets, focusing coils, and a pair of tracking coils. The fixed block is fixed to the moving base. The movable block includes the objective lens and a lens holder holding the objective lens, and is moved with respect to the fixed block at least in a focusing direction corresponding to a direction approaching or separating from a recording surface of the disk-like recording medium and a tracking direction substantially corresponding to the radial direction of the disk-like recording medium. The plurality of supporting springs are configured to connect the fixed block and the movable block. The focusing magnets are configured to move the movable block in the focusing direction. The tracking magnets are configured to move the movable block in the tracking direction, and each of the tracking magnets has two magnetized poles. The focusing coils are positioned to face the focusing magnets. The pair of tracking coils are positioned to face the tracking magnets and to be apart from each other in the tracking direction. North and south poles of each of the tracking magnets are positioned to be adjacent to each other in the tracking direction. A boundary between the north and south poles of the tracking magnet is formed by an arbitrary line segment not being one straight line.

In the disk drive device, therefore, the generation of unnecessary torque can be suppressed in the tracking operation and the focusing operation, and the transmission characteristic can be improved.

DESCRIPTION OF THE PREFERRED EMBODIMENTS

An optical pickup and a disk drive device according to a preferred embodiment of the present invention will be described below with reference to the accompanying drawings.

Figure 1:
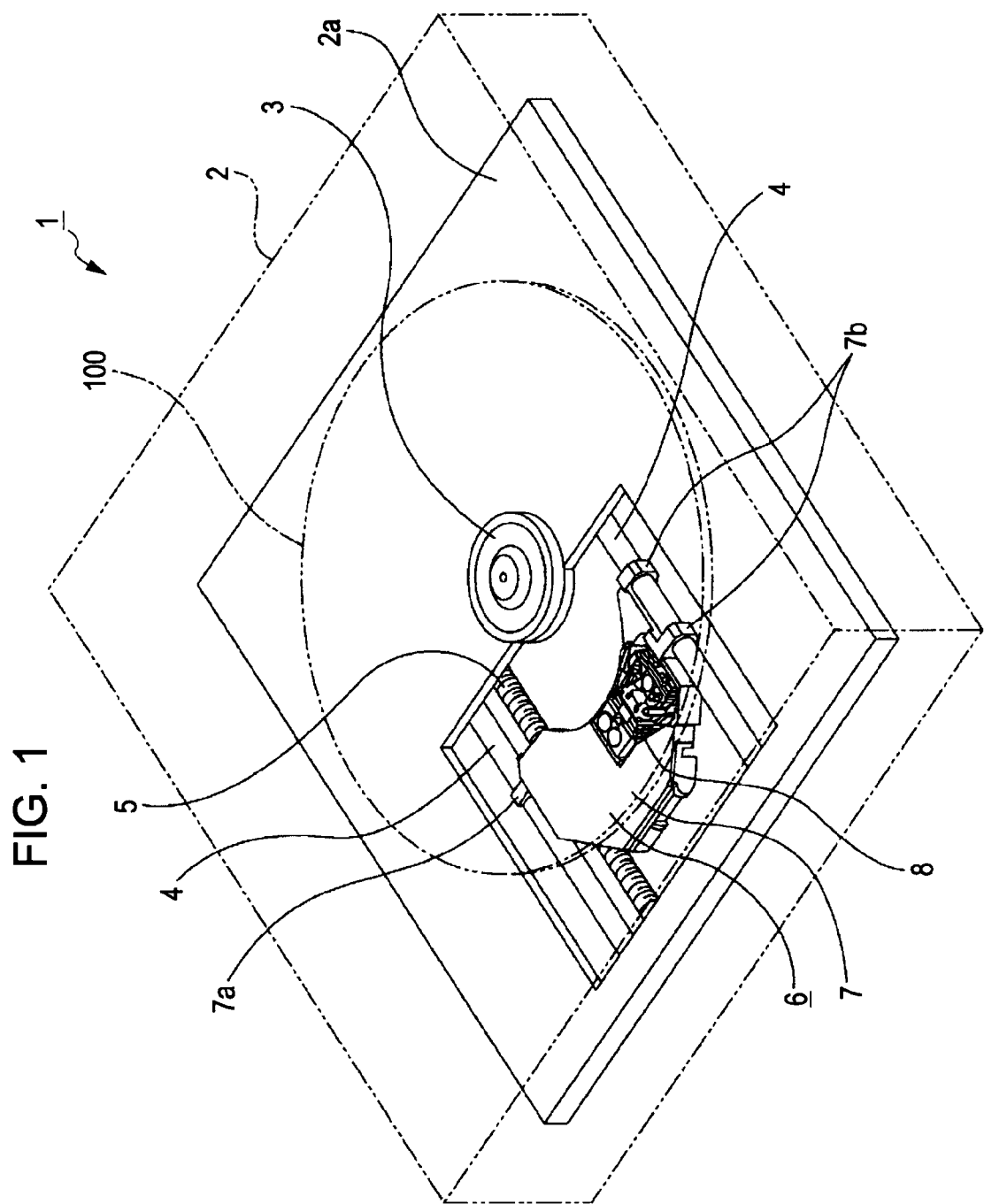
FIG. 1 is a schematic perspective view of a disk drive device illustrating, together with FIGS. 2 to 12, an optical pickup and a disk drive device according to a preferred embodiment of the present invention.

A disk drive device 1 is configured to include necessary members and mechanisms disposed inside an outer casing 2 (see FIG. 1). The outer casing 2 is formed with a not-illustrated disk insertion opening.

A chassis 2a is disposed inside the outer casing 2, and a disk table 3 is fixed to a motor shaft of a spindle motor attached to the chassis 2a.

The chassis 2a is attached with mutually parallel guide shafts 4, and supports a lead screw 5 rotated by a not-illustrated feed motor.

An optical pickup 6 includes a moving base 7, necessary optical components provided to the moving base 7, and an objective lens drive device 8 disposed on the moving base 7. Bearing portions 7a and 7b provided to the opposite end portions of the moving base 7 are slidably supported by the guide shafts 4.

A not-illustrated nut number provided to the moving base 7 is screwed onto the lead screw 5. As the lead screw 5 is rotated by the feed motor, the nut member is moved in a direction according to the rotation direction of the lead screw 5. Thereby, the optical pickup 6 is moved in the radial direction of a disk-like recording medium 100 mounted on the disk table 3.

The objective lens drive device 8 includes a fixed block 9 and a movable block 10 moved with respect to the fixed block 9 (see FIG. 2), and is disposed on the moving base 7 (see FIG. 1). The fixed block 9 is fixed to the moving base 7. A rear surface of the fixed block 9 is attached with circuit boards 11 (see FIG. 2). The movable block 10 is configured to include a lens holder 12 attached with necessary components (see FIGS. 2 and 3).

Figure 3:
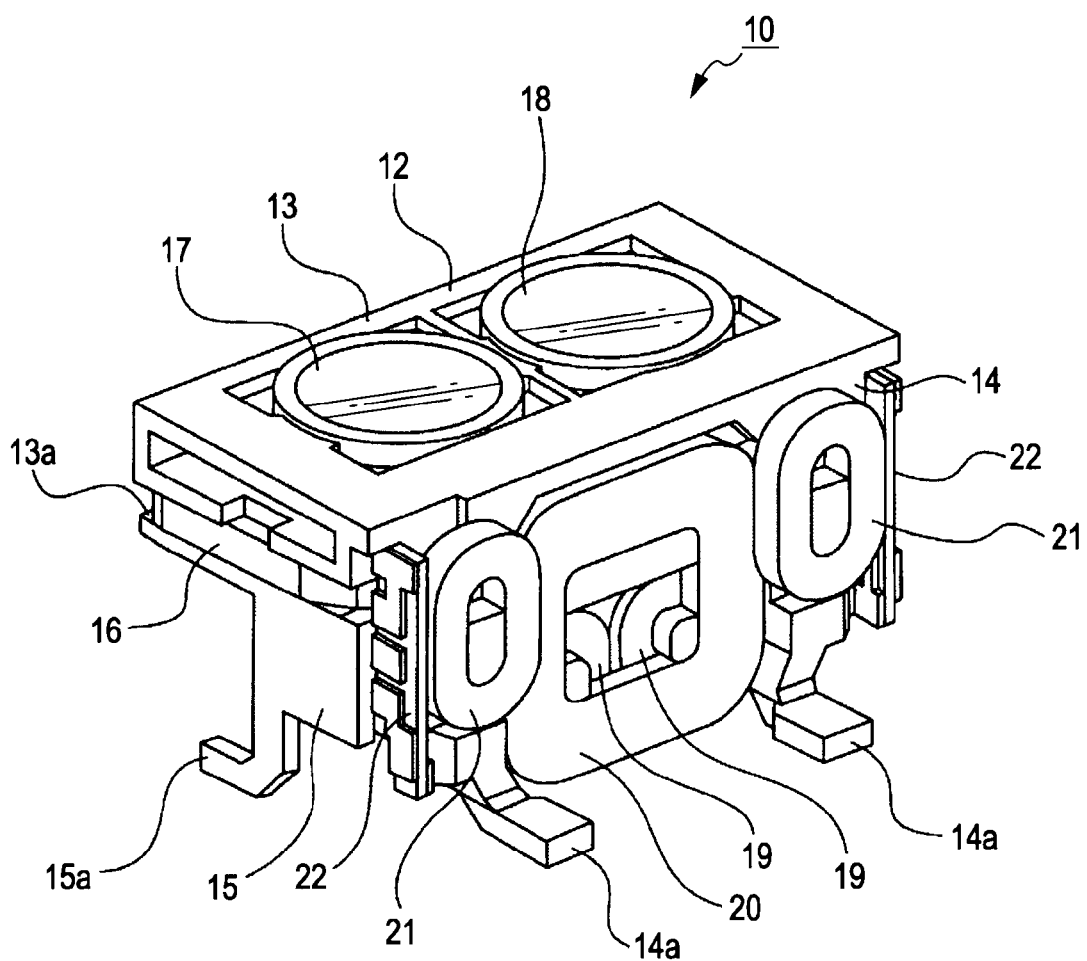
FIG. 3 is an enlarged perspective view of a movable block.

As illustrated in FIG. 3, the lens holder 12 includes a lens attaching portion 13 oriented in the vertical direction, a coil attaching portion 14 projecting downward from a rear end portion of the lens attaching portion 13, and side surface portions 15 projecting downward from right and left end portions of the lens attaching portion 13. The lens holder 12 includes an optical path opening 12a which is opened forward.

Figure 2:
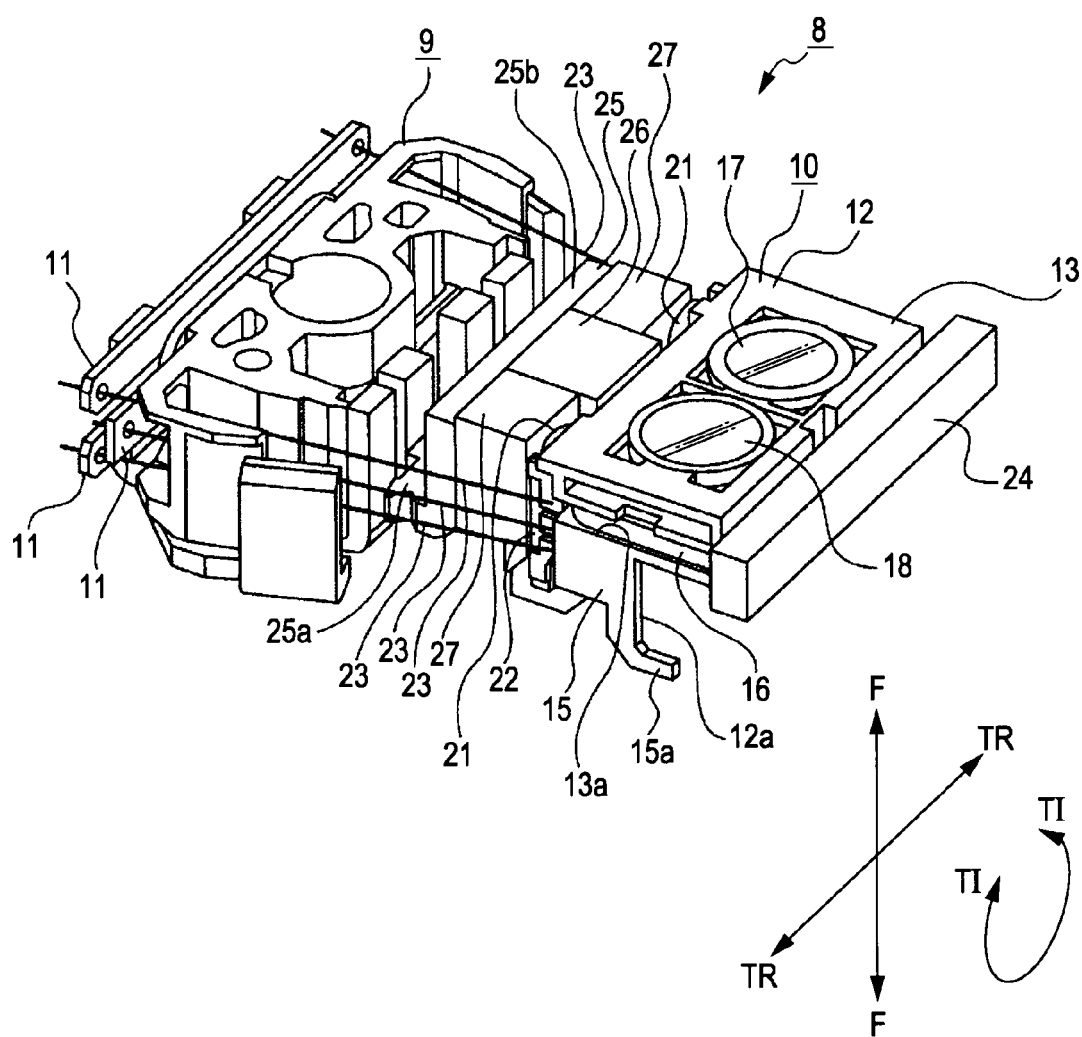
FIG. 2 is an enlarged perspective view of an objective lens drive device.

The lens attaching portion 13 of the lens holder 12 includes a coil attaching groove 13a formed all around the circumference of the lens attaching portion 13 at a position near the upper end thereof (see FIGS. 2 and 3). The coil attaching groove 13a is attached with a first focusing coil 16. Therefore, the axial direction of the first focusing coil 16 corresponds to the focusing direction (vertical direction).

Objective lenses 17 and 18 are attached in and held by the upper surface of the lens attaching portion 13 of the lens holder 12. The objective lenses 17 and 18 are disposed apart from each other in the horizontal direction (tracking direction), and are provided to be compatible with different types of the disk-like recording mediums 100, such as CD (Compact Disc) for which laser light having a frequency of approximately 780 nm is used, DVD (Digital Versatile Disc) for which laser light having a frequency of approximately 660 nm is used, and Blu-ray Disc for which laser light having a frequency of approximately 405 nm is used, for example.

A not-illustrated upward reflecting mirror is provided below the objective lenses 17 and 18. The upward reflecting mirror has a function of receiving laser light emitted from a not-illustrated light source and incident on the upward reflecting mirror through the optical path opening 12a, and perpendicularly reflecting the laser light to be incident on the objective lenses 17 and 18.

The coil attaching portion 14 of the lens holder 12 includes first stoppers 14a provided to a lower end portion thereof (see FIG. 3). The first stoppers 14a are provided to be apart from each other in the horizontal direction, and project rearward.

The coil attaching portion 14 is attached with tilting coils 19, a second focusing coil 20, and tracking coils 21. The tilting coils 19 are attached to the rear surface of the coil attaching portion 14 to be apart from each other in the horizontal direction. The axial direction of the tilting coils 19 corresponds to the tangential direction (anteroposterior direction).

The second focusing coil 20 is attached to the rear surface of the coil attaching portion 14 to partially cover the tilting coils 19 from the rear side. The axial direction of the second focusing coil 20 corresponds to the tangential direction.

The tracking coils 21 are attached to the right and left sides of the second focusing coil 20. The axial direction of the tracking coils 21 corresponds to the tangential direction.

The side surface portions 15 of the lens holder 12 include second stoppers 15a provided to respective lower end portions thereof (see FIGS. 2 and 3). The second stoppers 15a project forward.

The coil attaching portion 14 of the lens holder 12 is attached with connection boards 22 on right and left end portions thereof. A connection terminal of each of the connection boards 22 is connected to respective end portions of the first focusing coil 16, the second focusing coil 20, the tracking coils 21, and the tilting coils 19. The connection boards 22 are joined to respective front end portions of supporting springs 23 by soldering, for example. Each of the supporting springs 23 is formed of a conductive metal material into a wire shape, for example.

The circuit boards 11 attached to the fixed block 9 are joined to respective rear end portions of the supporting springs 23 by soldering, for example.

With the opposite end portions of the supporting springs 23 joined to the connection boards 22 of the movable block 10 and the circuit boards 11 of the fixed block 9 as described above, the movable block 10 is connected to the fixed block 9 by the supporting springs 23 and held in the air.

In the objective lens drive device 8, drive current is supplied from a not-illustrated power supply circuit to the first focusing coil 16, the second focusing coil 20, the tracking coils 21, and the tilting coils 19 via the circuit boards 11, the supporting springs 23, and the connection boards 22.

On the front side of the movable block 10, a horizontally long first focusing magnet 24 is disposed (see FIG. 2). The first focusing magnet 24 is attached to, for example, a not-illustrated attaching portion of the moving base 7, and is located in front of the first focusing coil 16 and above the optical path opening 12a.

On the moving base 7, a yoke member 25 formed of a magnetic metal material is disposed. The yoke member 25 includes a base portion 25a oriented in the vertical direction and a yoke portion 25b projecting upward from the base portion 25a.

The front surface of the yoke portion 25b is attached with a second focusing magnet 26 and tracking magnets 27. Each of the tracking magnets 27 has two magnetized poles of north and south poles adjacent to each other in the horizontal direction. The second focusing magnet 26 is located between the tracking magnets 27. The yoke member 25 is attached with a not-illustrated tilting magnet.

The second focusing magnet 26 is positioned to face the second focusing coil 20. The tracking magnets 27 are positioned to face the tracking coils 21. The tilting magnet is positioned to face the tilting coils 19.

The objective lens drive device 8 may be configured not to include the special tilting magnet. For example, the objective lens drive device 8 can be configured such that the second focusing magnet 26 also serves as the tilting magnet. In this case, the tilting coils 19 are positioned to face the second focusing magnet 26, which also serves as the tilting magnet.

The first focusing coil 16, the second focusing coil 20, the first focusing magnet 24, the second focusing magnet 26, and the yoke member 25 constitute a focusing magnetic circuit. The tracking coils 21, the tracking magnets 27, and the yoke member 25 constitute a tracking magnetic circuit. The tilting coils 19, the tilting magnet, and the yoke member 25 constitute a tilting magnetic circuit.

When the drive current is supplied from the not-illustrated power supply circuit to the first focusing coil 16 and the second focusing coil 20, the tracking coils 21, or the tilting coils 19, force (thrust force) is generated which acts in a direction according to the direction of the drive current and the direction of a magnetic flux generated by the first focusing magnet 24 and the second focusing magnet 26, the tracking magnets 27, or the tilting magnet. As a result, the movable block 10 is moved in the focusing direction, the tracking direction, or the tilting direction.

The focusing direction corresponds to a direction approaching or separating from the disk-like recording medium 100 (direction F shown in FIG. 2), i.e., the vertical direction. The tracking direction corresponds to a radial direction of the disk-like recording medium 100 (direction TR shown in FIG. 2), i.e., the horizontal direction. The tilting direction corresponds to a direction perpendicular to both the focusing direction and the tracking direction (tangential direction), i.e., a direction around an axis extending in the anteroposterior direction (direction TI shown in FIG. 2).

When the movable block 10 is moved in the focusing direction, the tracking direction, or the tilting direction, the supporting springs 23 are resiliently deformed.

In the disk drive device 1 configured as described above, when the disk table 3 is rotated along with the rotation of the spindle motor, the disk-like recording medium 100 mounted on the disk table 3 is rotated. At the same time, the optical pickup 6 is moved in the radial direction of the disk-like recording medium 100, and a recording or reproducing operation is performed on the disk-like recording medium 100.

In the recording or reproducing operation, when the drive current is supplied to the first focusing coil 16 and the second focusing coil 20, the movable block 10 of the objective lens drive device 8 is moved with respect to the fixed block 9 in the focusing direction F shown in FIG. 2, as described above. Thereby, focus adjustment is performed such that the spot of the laser light applied via the objective lenses 17 and 18 is collected on a recording surface of the disk-like recording medium 100.

In the focus adjustment, the first stoppers 14a or the second stoppers 15a provided to the lens holder 12 can come into contact with a not-illustrated controlled member. As the first stoppers 14a or the second stoppers 15a come into contact with the controlled member, therefore, an unnecessary excessive movement of the movable block 10 in the focusing direction is regulated.

As the controlled member which can come into contact with the first stoppers 14*a* or the second stoppers 15*a*, a not-illustrated stopped member provided to the moving base 7 can be used.

Further, as the controlled member, the first focusing magnet 24 contactable with the second stoppers 15*a* or the tracking magnets 27 contactable with the first stoppers 14*a* can also be used. With the use of the first focusing magnet 24 or the tracking magnets 27 as the controlled member, the special controlled member is unnecessary. Therefore, the number of components is reduced, and the space for placing the controlled member becomes unnecessary. Accordingly, the objective lens drive device 8 can be reduced in size.

When the drive current is supplied to the tracking coils 21, the movable block 10 of the objective lens drive device 8 is moved with respect to the fixed block 9 in the tracking direction TR shown in FIG. 2, as described above. Thereby, tracking adjustment is performed such that the spot of the laser light applied via the objective lenses 17 and 18 is collected on a recording track of the disk-like recording medium 100.

Further, when the drive current is supplied to the tilting coils 19, the movable block 10 of the objective lens drive device 8 is moved with respect to the fixed block 9 in the tilting direction TI shown in FIG. 2, as described above. Thereby, tilt adjustment is performed such that the optical axis of the laser light applied via the objective lenses 17 and 18 is perpendicular to the recording surface of the disk-like recording medium 100.

In the objective lens drive device 8, the tracking magnetic circuit constituted by the tracking coils 21, the tracking magnets 27, and the yoke member 25 is provided only on the side of the movable block 10 facing the fixed block 9.

In the objective lens drive device 8, therefore, the upward reflecting mirror is disposed at substantially the same position (height) as the position at which the tracking magnetic circuit is provided. Accordingly, the objective lens drive device 8 can be slimmed down.

Further, a balancer for setting the centroid of the movable block 10 in the vicinity of the tracking magnetic circuit is not provided on the opposite side of the objective lenses 17 and 18 across the tracking magnetic circuit. Therefore, the movable block 10 is light in weight. Accordingly, the sensitivity can be improved in the focus adjustment, the tracking adjustment, and the tilt adjustment.

Further, due to the absence of a balancer on the opposite side of the objective lenses 17 and 18 across the tracking magnetic circuit, the length in the tangential direction of the movable block 10 is not increased. Accordingly, the high-order resonance characteristic can be improved.

In the objective lens drive device 8, however, the centroid of the movable block 10 is located closer to the objective lenses 17 and 18 than to the tracking magnetic circuit. Therefore, there is a concern about the generation of torque acting around an axis passing through the centroid of the movable block 10 and extending in the focusing direction (Z-axis) and torque acting around an axis extending in the tangential direction (X-axis) which occurs in the movement of the movable block 10 in the focusing direction.

In the objective lens drive device 8, therefore, it is necessary to suppress the generation of the torque acting around the Z-axis and the torque acting around the X-axis.

Figure 4:
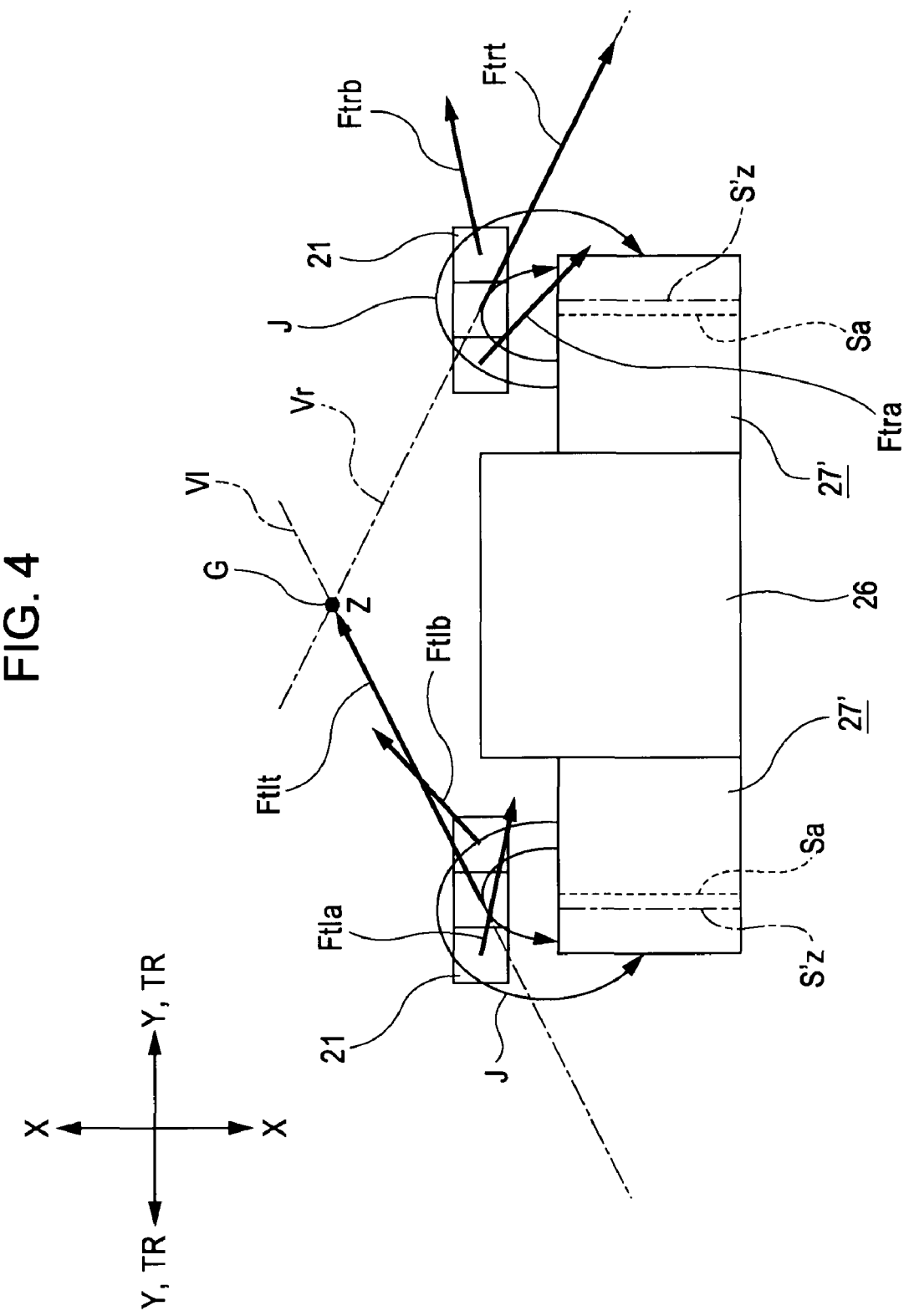
FIG. 4 is a conceptual diagram illustrating the generation of torque acting around a Z-axis.

Description will first be made of the suppression of the generation of the torque acting around the Z-axis (see FIG. 4). Respective magnetic fluxes J generated around tracking magnets 27' generate thrust forces Ftla and Ftlb in left and right portions of the tracking coil 21 located on the left side, and thrust forces Ftra and Ftrb in left and right portions of the tracking coil 21 located on the right side. The torque acting around the Z-axis can be suppressed by the adjustment of the direction of a combined thrust force Ftlt combining the thrust forces Ftla and Ftlb and the direction of a combined thrust force Ftrt combining the thrust forces Ftra and Ftrb. That is, the adjustment is performed such that an extension line Vl of the vector of the combined thrust force Ftlt and an extension line Vr of the vector of the combined thrust force Ftrt pass through the Z-axis (centroid G).

The centroid G and the center of the reaction force of the supporting springs 23 generally match, but do not match in some cases due to a design limitation. In such cases, the Z-axis passes through the center of the reaction force of the supporting springs 23. If the Z-axis passes through the centroid G, the movable block 10 performs dynamic torsional motion due to the generation of the torque acting around the Z-axis. If the Z-axis passes through the center of the reaction force of the supporting springs 23, the movable block 10 performs static torsional motion due to the generation of the torque acting around the Z-axis.

To have the extension lines Vl and Vr pass through the Z-axis, each of the tracking magnets 27' having two magnetized poles is formed such that a boundary S'z between the north and south poles of the tracking magnet 27' is located at a predetermined position with respect to the corresponding tracking coil 21. In this case, the boundary S'z in the tracking magnet 27' is assumed to be a straight line extending in the vertical direction.

The direction of the combined thrust force Ftlt or Ftrt varies in accordance with the position in the tracking direction (Y-direction) of the boundary S'z with respect to the corresponding tracking magnet 27'. Therefore, if the boundary S'z is formed at a predetermined position in the tracking direction, the adjustment can be performed such that the extension line Vl of the vector of the combined thrust force Ftlt and the extension line Vr of the vector of the combined thrust force Ftrt pass through the Z-axis. For example, as illustrated in FIG. 4, each of the tracking magnets 27' is formed such that the boundary S'z is shifted outward in the tracking direction (Y-direction) from a boundary Sa set in a related art tracking magnet.

Figure 5:
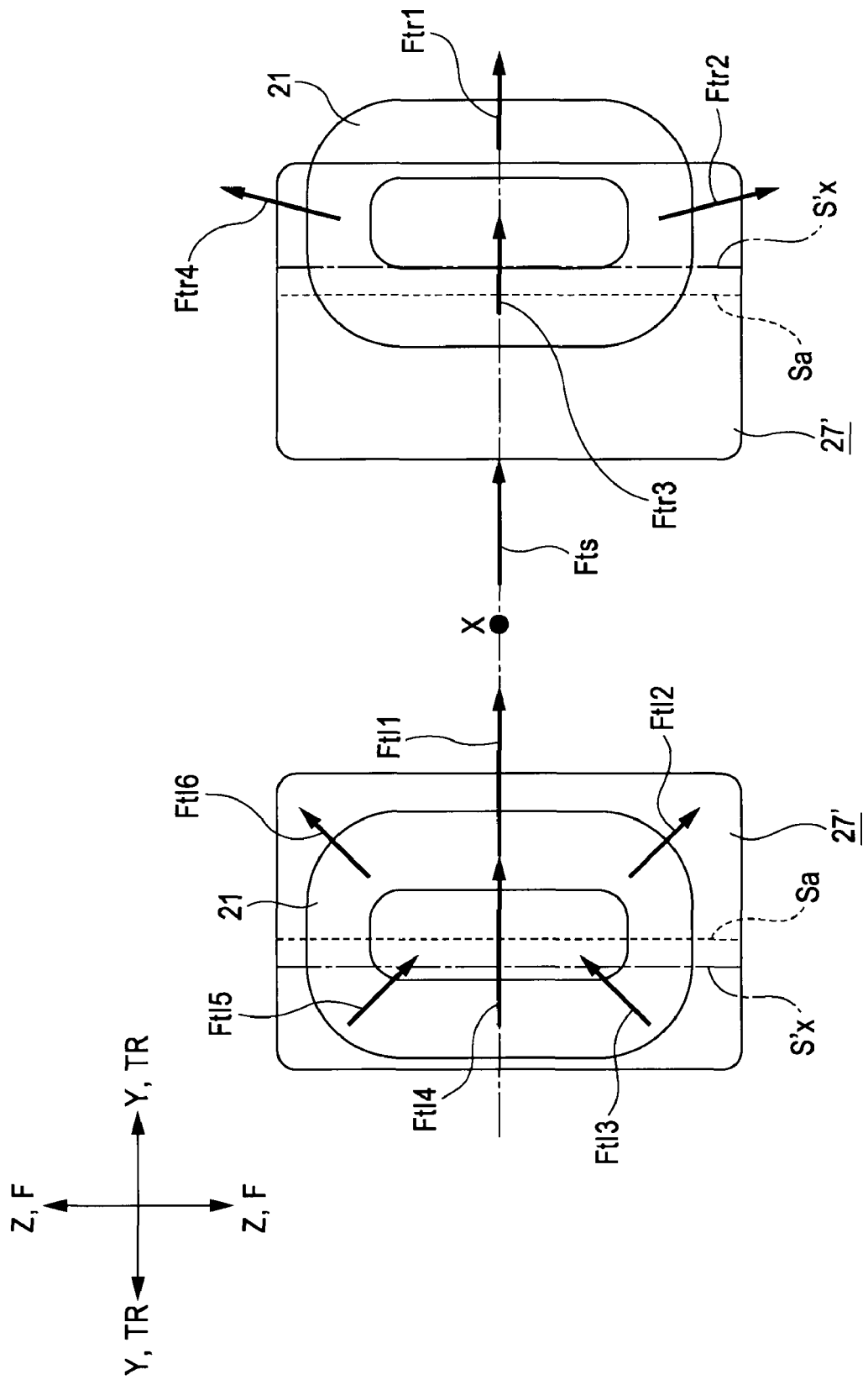
FIG. 5 is a conceptual diagram illustrating, together with FIG. 6, the generation of torque acting around an X-axis, and showing the directions and magnitudes of respective forces obtained when the movable block is located at a neutral position in a focusing direction.
Figure 6:
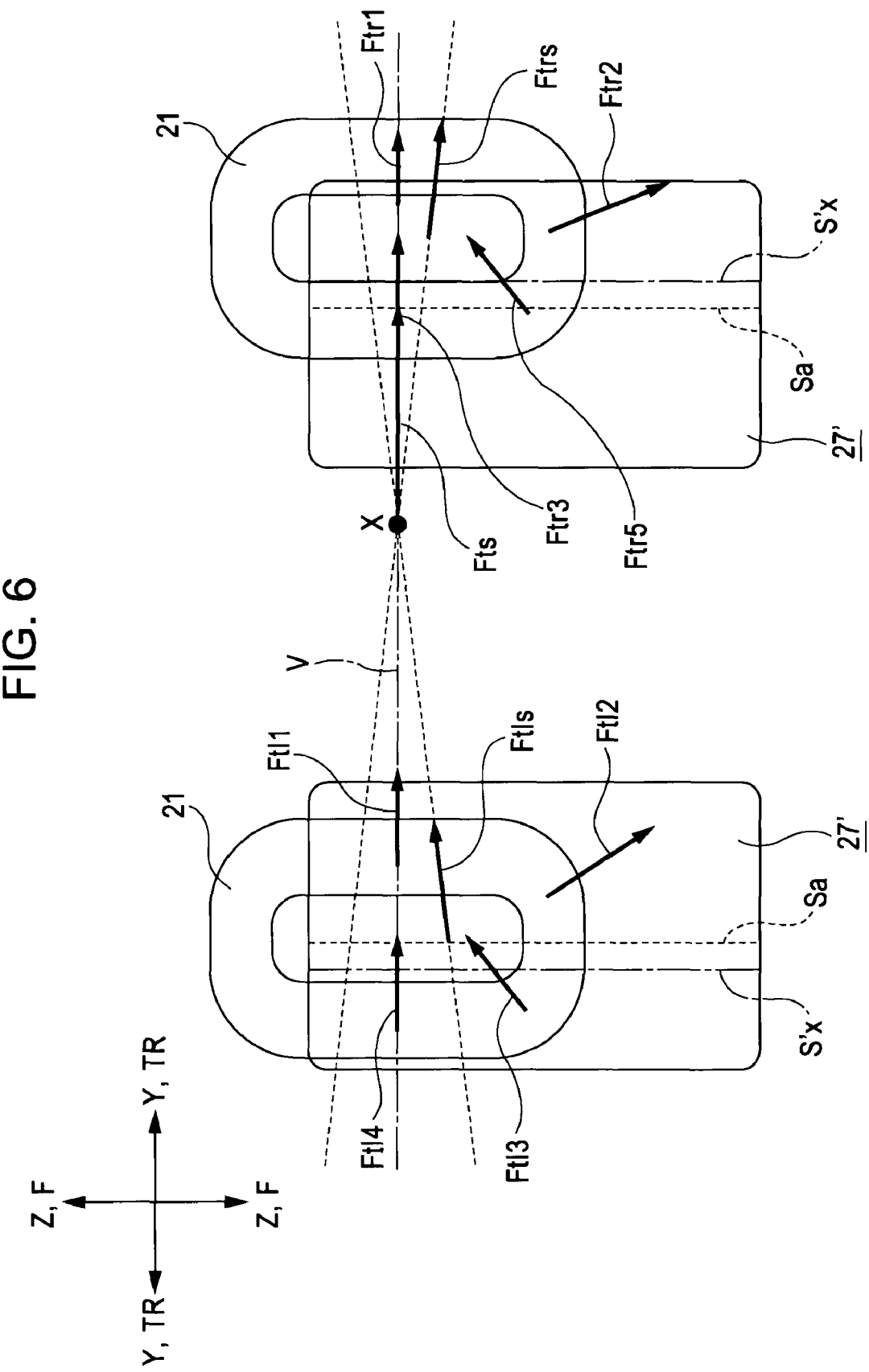
FIG. 6 is a conceptual diagram showing the directions and magnitudes of respective forces obtained when the movable block has been moved in the focusing direction.

Subsequently, description will be made of the suppression of the generation of the torque acting around the X-axis (see FIGS. 5 and 6). FIG. 5 is a conceptual diagram illustrating the directions and magnitudes of respective forces in a state in which the movable block 10 is located at a neutral position in the focusing direction, i.e., a state prior to the movement of the movable block 10 in the focusing direction. FIG. 6 is a conceptual diagram illustrating the directions and magnitudes of respective forces in a state in which the movable block 10 has been moved in the focusing direction.

In the tracking coil 21 located on the left side, a combined thrust force Ftls is generated which combines thrust forces Ftl1, Ftl2, Ftl3, and so forth generated in respective areas of the tracking coil 21. In the tracking coil 21 located on the right side, a combined thrust force Ftrs is generated which combines thrust forces Ftr1, Ftr2, Ftr3, and so forth generated in respective areas of the tracking coil 21. As illustrated in FIG. 6, when the movable block 10 is moved in the focusing direction, an upper (or lower) end portion of each of the tracking coils 21 shifts from the position facing the corresponding tracking magnet 27. Thus, a change occurs particularly in the magnitude and direction of force generated in the shifted portion. In the state in which the movable block 10 has been moved in the focusing direction, therefore, the magnitudes and directions of the combined thrust forces Ftls and Ftrs have been changed from the magnitudes and directions of the combined thrust forces Ftls and Ftrs in the state prior to the movement of the movable block 10 in the focusing direction.

The torque acting around the X-axis can be suppressed by the adjustment of the direction of a combined thrust force Fts which combines the combined thrust force Ftls generated in the tracking coil 21 located on the left side and the combined thrust force Ftrs generated in the tracking coil 21 located on the right side. That is, the adjustment is performed such that an extension line V of the vector of the combined thrust force Fts passes through the X-axis. The direction of the combined thrust force Fts varies in accordance with the magnitudes and directions of the combined thrust forces Ftls and Ftrs, which vary in accordance with the movement of the movable block 10 in the focusing direction. Therefore, it is necessary to perform the adjustment such that the extension line V of the vector of the combined thrust force Fts passes through the X-axis in the movement of the movable block 10 in the focusing direction.

To have the extension line V pass through the X-axis, each of the tracking magnets 27' having two magnetized poles is formed such that a boundary S'x between the north and south poles of the tracking magnet 27' is located at a predetermined position with respect to the corresponding tracking coil 21. In this case, the boundary S'x of the tracking magnet 27' is formed into a straight line extending in the vertical direction.

The direction of the combined thrust force Fts varies in accordance with the position in the tracking direction of the boundary S'x. Thus, if the boundary S'x is formed at a predetermined position in the tracking direction, the adjustment can be performed such that the extension line V of the vector of the combined thrust force Fts passes through the X-axis. For example, as illustrated in FIG. 6, each of the tracking magnets 27' is formed such that the boundary S'x is shifted outward in the tracking direction (Y-direction) from a boundary Sa set in a related art tracking magnet.

Figure 7:
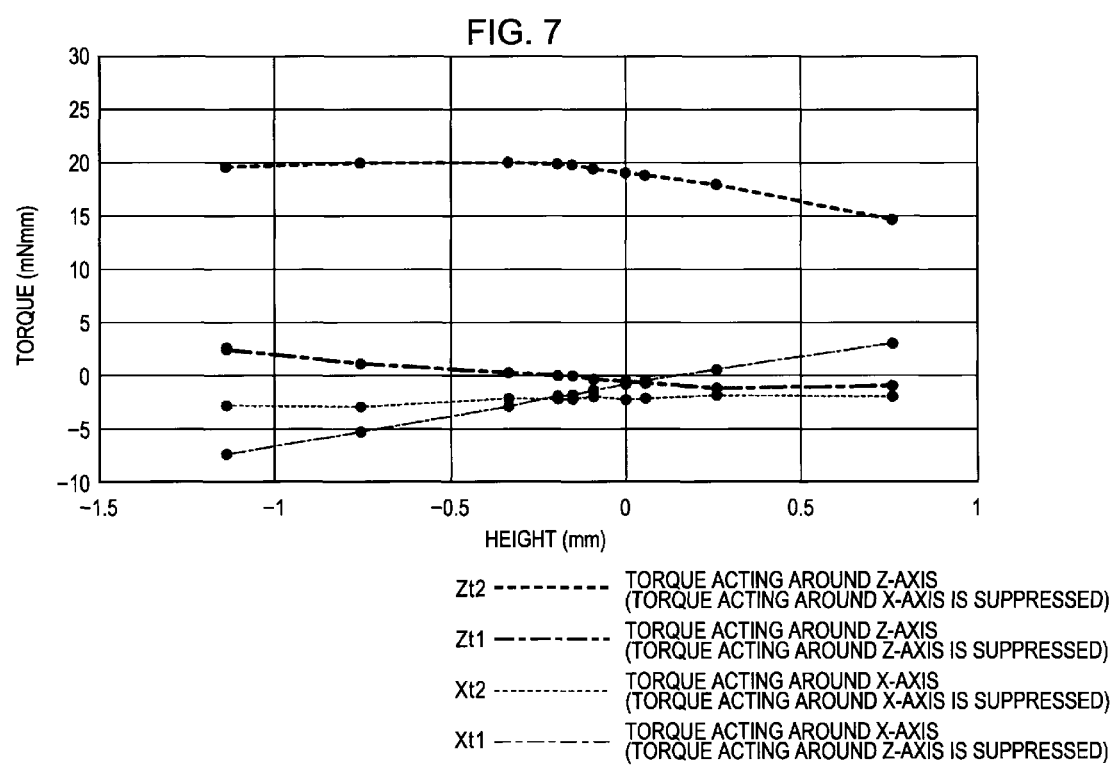
FIG. 7 is graphs showing the amounts of torques generated when the positions of respective boundaries in tracking magnets are set to suppress the torque acting around the Z-axis and the torque acting around the X-axis.

FIG. 7 is graphs showing the amounts of torques generated when the positions of the boundaries S'z and S'x in the tracking magnets 27' are set to suppress the torque acting around the Z-axis and the torque acting around the X-axis. The horizontal axis represents the height of the tracking magnets 27', with the reference set to the neutral position (a height of zero) in the movement of the movable block 10 in the focusing direction. The vertical axis represents the amount of generated torque.

As shown in FIG. 7, when the positions of the boundaries S'z are set to suppress the torque acting around the Z-axis, torque Zt1 acting around the Z-axis is hardly generated. However, torque Xt1 acting around the X-axis substantially varies in accordance with the position in the focusing direction of the tracking magnets 27.

Meanwhile, when the positions of the boundaries S'x are set to suppress the torque acting around the X-axis, torque Xt2 acting around the X-axis is hardly generated. However, the generated amount of torque Zt2 acting around the Z-axis is large.

Therefore, the boundaries S'z and S'x are effective in suppressing the torque acting around the Z-axis and the torque acting around the X-axis, respectively. However, neither of the boundaries S'z and S'x provides an effect of suppressing both the torque acting around the Z-axis and the torque acting around the X-axis at the same time.

Figure 8:
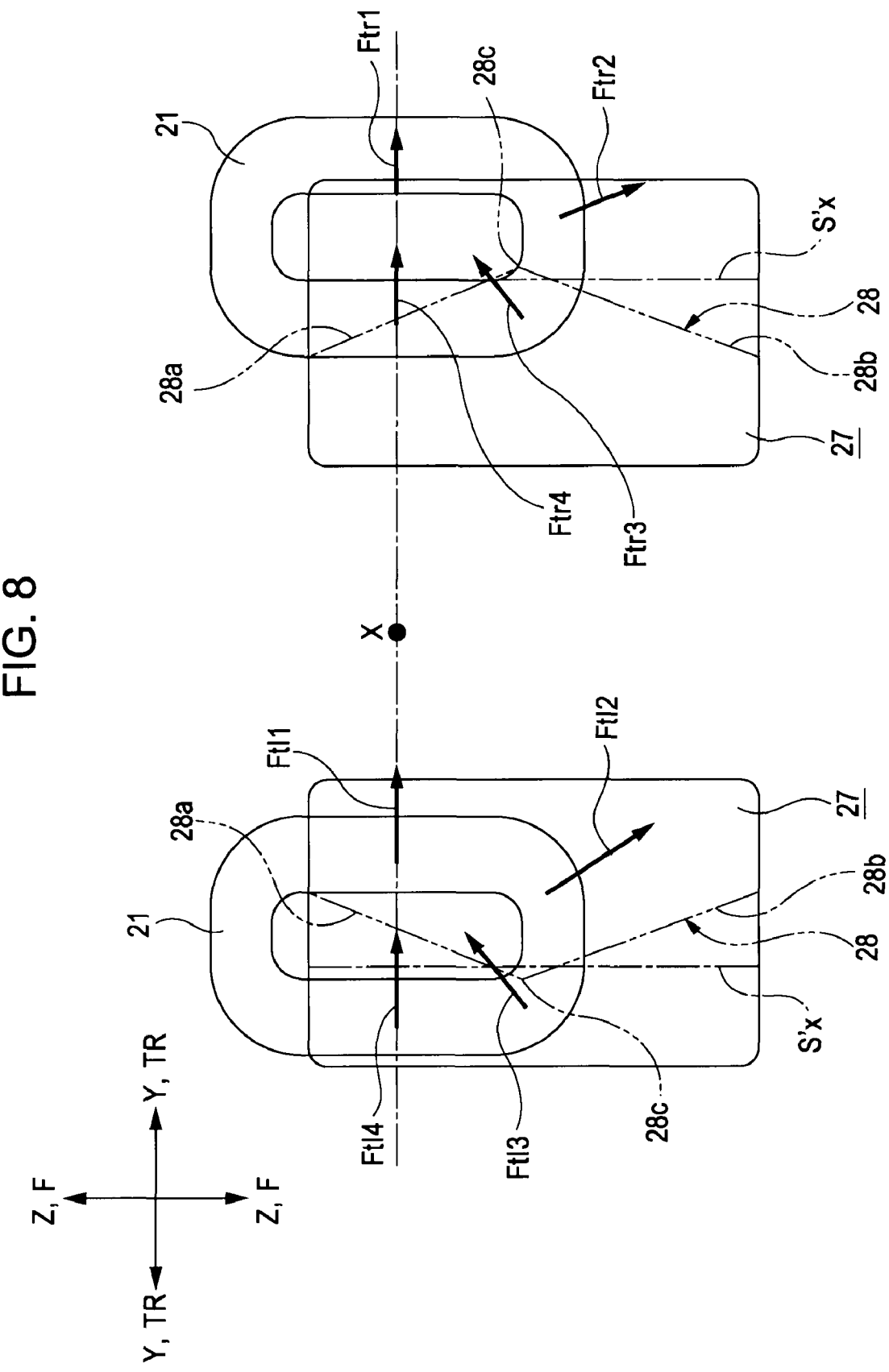
FIG. 8 is a conceptual diagram illustrating the positions of the tracking magnets and tracking coils with respect to the boundaries when the movable block has been moved in the focusing direction.

In the objective lens drive device 8 according to the embodiment of the present invention, therefore, the tracking magnets 27 are formed with the boundaries set as follows to suppress both the torque acting around the Z-axis and the torque acting around the X-axis at the same time (see FIG. 8).

A boundary 28 of each of the tracking magnets 27 is formed by the combination of at least two straight or curved lines. For example, the boundary 28 is formed by a first straight line segment 28a and a second straight line segment 28b. The first straight line segment 28a is tilted outward in the horizontal direction (tracking direction) from the upper end thereof toward the lower side. The second straight line segment 28b continues from the lower end of the first straight line segment 28a, and is tilted inward in the horizontal direction toward the lower side. A connection point 28c between the first straight line segment 28a and the second straight line segment 28b is located at, for example, the center in the vertical direction (focusing direction) of the corresponding tracking magnet 27. Therefore, the tracking magnet 27 is formed such that the area of the upper half portion of the outer pole is increased toward the upper side, and that the area of the lower half portion of the outer pole is increased toward the lower side. Further, the tracking magnet 27 is formed such that the area of the upper half portion of the inner pole is reduced toward the upper side, and that the area of the lower half portion of the inner pole is reduced toward the lower side.

The torque acting around the X-axis is subject to the influence of the thrust force generated at an end portion of each of the tracking coils 21 opposite to the other end portion of the tracking coil 21 shifted from the position facing the corresponding tracking magnet 27. That is, when the tracking coil 21 is moved upward, the torque acting around the X-axis is subject to the influence of the thrust force generated at the lower end portion of the tracking coil 21. Meanwhile, when the tracking coil 21 is moved downward, the torque acting around the X-axis is subject to the influence of the thrust force generated at the upper end portion of the tracking coil 21. The lower end portion of the upward moved tracking coil 21 and the upper end portion of the downward moved tracking coil 21 are positioned to face the central portion in the vertical direction of the corresponding tracking magnet 27. To suppress the torque acting around the X-axis, therefore, it is desirable that the position of the connection point 28c of the boundary 28 located at the central portion in the vertical direction of the tracking magnet 27 is on or in the vicinity of the above-described boundary S'x.

In the objective lens drive device 8, therefore, the connection point 28c of the boundary 28 in the tracking magnet 27 is set to be located on or in the vicinity of the boundary S'x.

Figure 9:
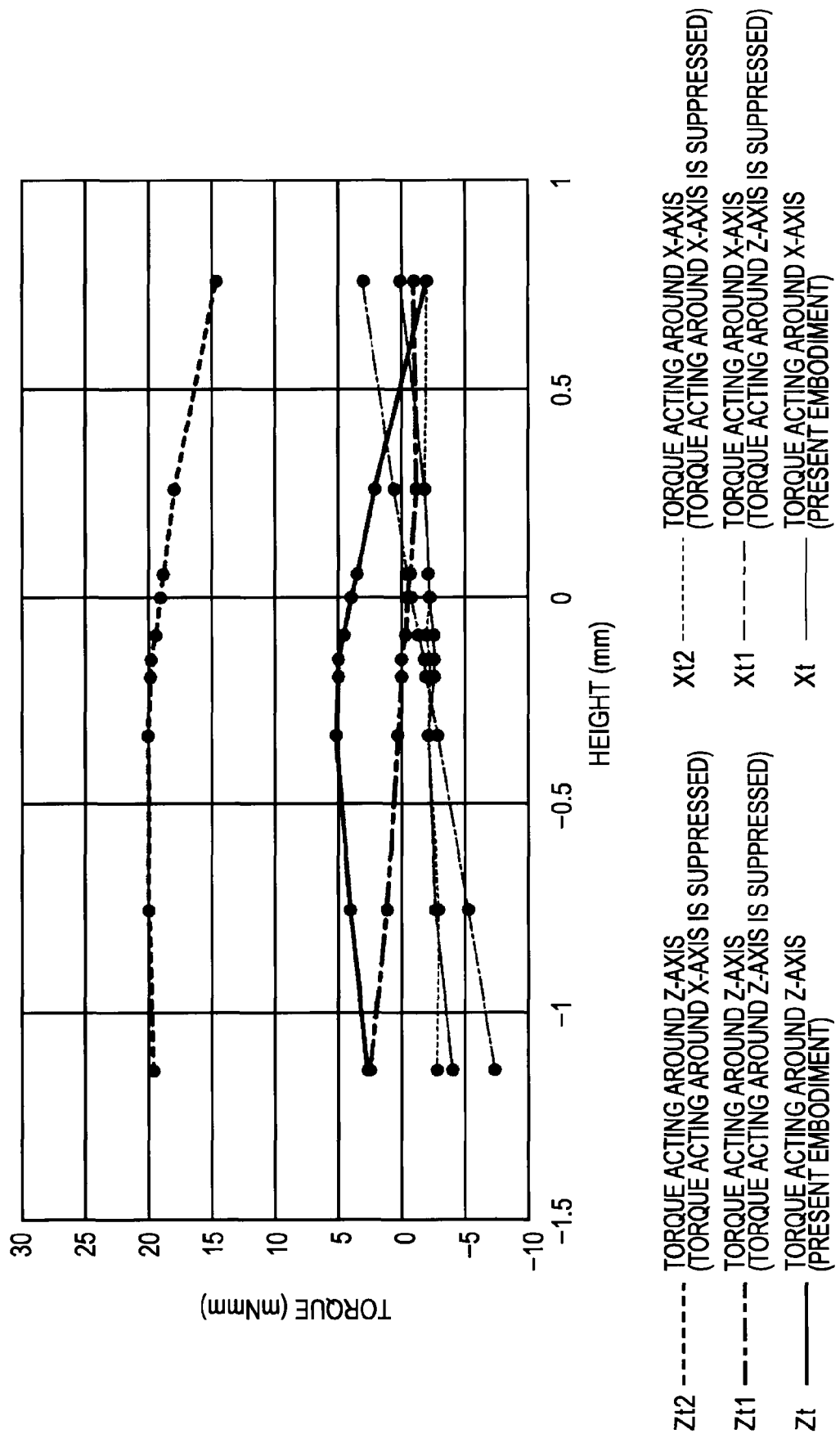
FIG. 9 is graphs showing the amounts of torques generated by the use of the tracking magnets illustrated in FIG. 8.

FIG. 9 is graphs showing the amounts of torques generated by the use of the tracking magnets 27 each having the boundary 28. The horizontal axis represents the height of the tracking magnets 27, with the reference set to the neutral position (a height of zero) in the movement of the movable block 10 in the focusing direction. The vertical axis represents the amount of generated torque. FIG. 9 also shows, as comparative data, the torques shown in FIG. 7, i.e., the torque Zt1 acting around the Z-axis and the torque Xt1 acting around the X-axis obtained when the positions of the boundaries S'z are set, and the torque Xt2 acting around the X-axis and the torque Zt2 acting around the Z-axis obtained when the positions of the boundaries S'x are set.

As shown in FIG. 9, the amounts of torque Zt acting around the Z-axis and torque Xt acting around the X-axis generated by the use of the tracking magnets 27 are substantially low. In the optical pickup 6, therefore, the use of the tracking magnets 27 each having the boundary 28 can suppress both of the unnecessary torques, i.e., the torque acting around the Z-axis and the torque acting around the X-axis generated in the tracking operation and the focusing operation, respectively. Accordingly, the transmission characteristic can be improved.

Further, in the objective lens drive device 8, the boundary 28 between the north and south poles in each of the tracking magnets 27 is formed by two consecutive straight lines tilted with respect to the focusing direction. Accordingly, the boundary 28 is simply configured, and the production of the tracking magnet 27 can be simplified.

Modified examples of the tracking magnet will be described below (see FIGS. 10 to 12).

Figure 10:
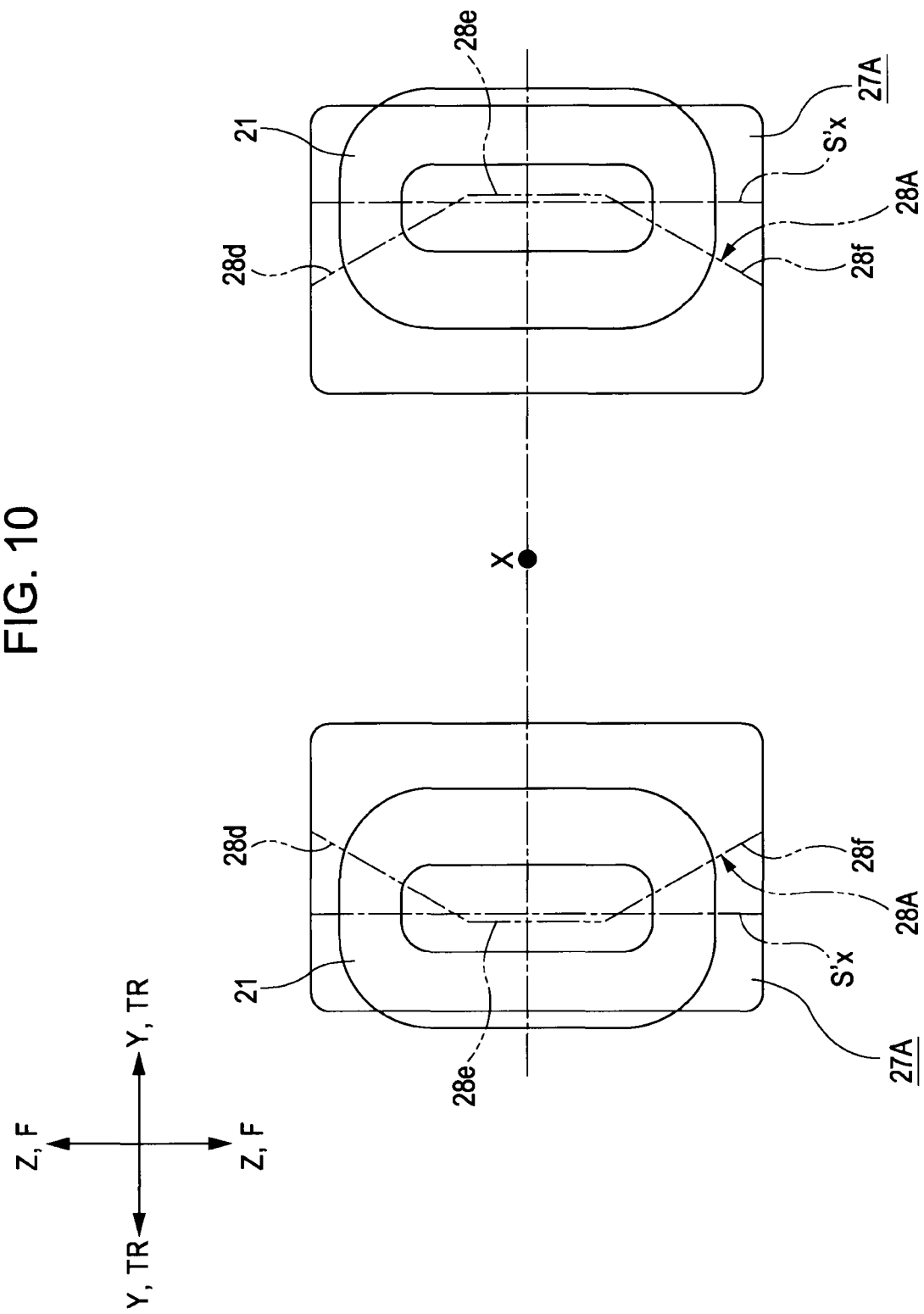
FIG. 10 is an enlarged rear view illustrating tracking magnets according to a first modified example.

In each of tracking magnets 27A according to a first modified example, a boundary 28A is formed by three consecutive straight line segments (see FIG. 10).

The tracking magnet 27A has two magnetized poles of north and south poles adjacent to each other in the horizontal direction. The tracking coils 21, the tracking magnets 27A, and the yoke member 25 constitute the tracking magnetic circuit.

In the tracking magnet 27A, the boundary 28A is formed by a first straight line segment 28d, a second straight line segment 28e, and a third straight line segment 28f. The first straight line segment 28d is tilted outward in the horizontal direction from the upper end thereof toward the lower side. The second straight line segment 28e continues from the lower end of the first straight line segment 28d, and extends in the vertical direction. The third straight line segment 28f continues from the lower end of the second straight line segment 28e, and is tilted inward in the horizontal direction toward the lower side.

In the boundary 28A, the center of the second straight line segment 28e is located at the center in the vertical direction of the tracking magnet 27A. To suppress the toque acting around the X-axis, the position of the second straight line segment 28e of the tracking magnet 27A is set to be located on or in the vicinity of the above-described boundary S'x.

In the optical pickup 6, the use of the tracking magnets 27A each having the boundary 28A can suppress both of the unnecessary torques, i.e., the torque acting around the Z-axis and the torque acting around the X-axis generated in the tracking operation and the focusing operation, respectively. Accordingly, the transmission characteristic can be improved.

Figure 11:
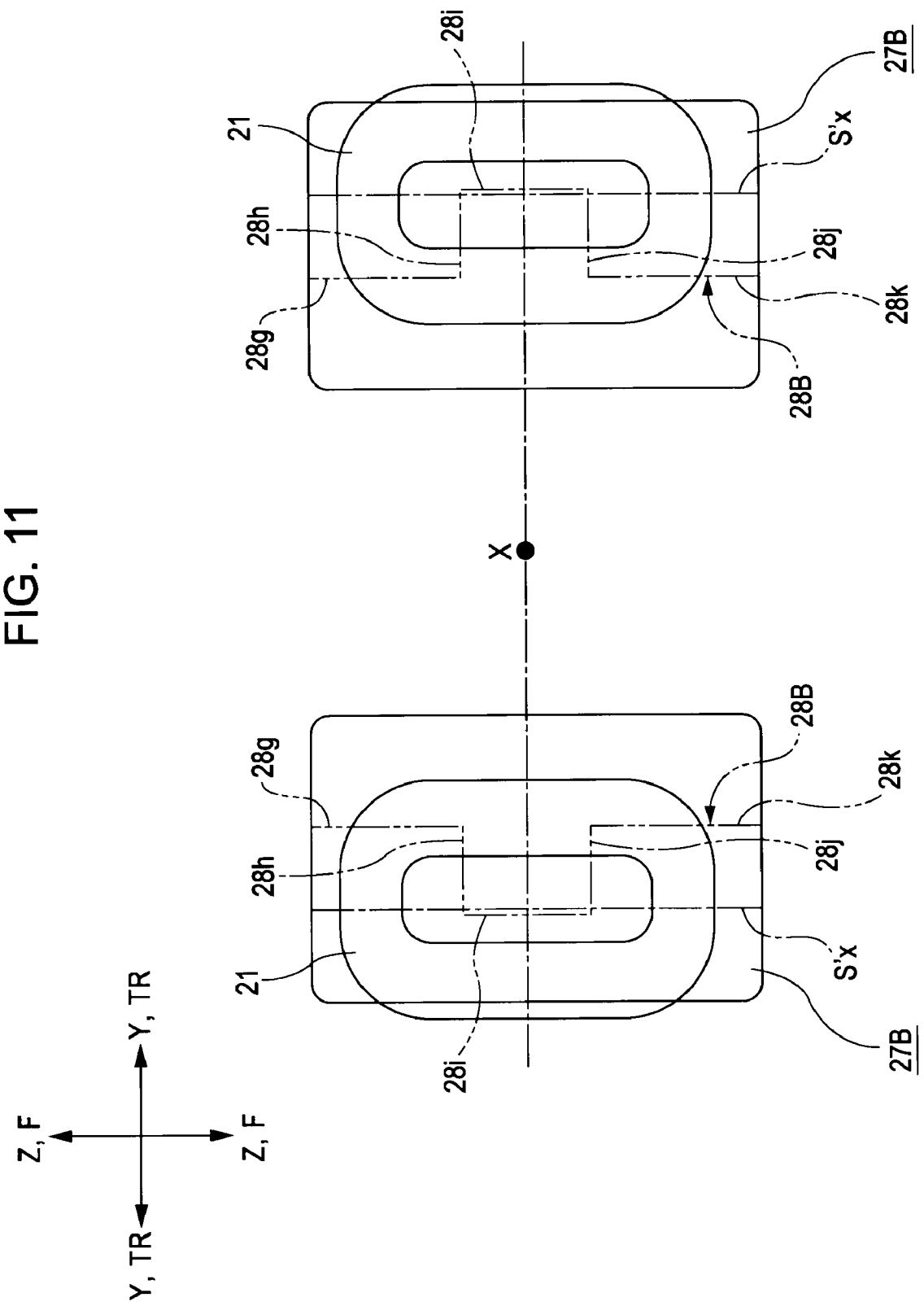
FIG. 11 is an enlarged rear view illustrating tracking magnets according to a second modified example.

In each of tracking magnets 27B according to a second modified example, a boundary 28B is formed by five consecutive straight line segments (see FIG. 11).

The tracking magnet 27B has two magnetized poles of north and south poles adjacent to each other in the horizontal direction. The tracking coils 21, the tracking magnets 27B, and the yoke member 25 constitute the tracking magnetic circuit.

In the tracking magnet 27B, the boundary 28B is formed by a first straight line segment 28g, a second straight line segment 28h, a third straight line segment 28i, a fourth straight line segment 28j, and a fifth straight line segment 28k. The first straight line segment 28g extends in the vertical direction. The second straight line segment 28h continues from the lower end of the first straight line segment 28g, and extends in the horizontal direction. The third straight line segment 28i continues from the outer end of the second straight line segment 28h, and extends in the vertical direction. The fourth straight line segment 28j continues from the lower end of the third straight line segment 28i, and extends in the horizontal direction. The fifth straight line segment 28k continues from the inner end of the fourth straight line segment 28j, and extends in the vertical direction. The second straight line segment 28h and the fourth straight line segment 28j, which extend in the horizontal direction, are formed at respective positions facing each other in the vertical direction.

In the boundary 28B, the center of the third straight line segment 28i is located at the center in the vertical direction of the tracking magnet 27B. To suppress the toque acting around the X-axis, the position of the third straight line segment 28i of the tracking magnet 27B is set to be located on or in the vicinity of the above-described boundary S'x.

In the optical pickup 6, the use of the tracking magnets 27B each having the boundary 28B can suppress both of the unnecessary torques, i.e., the torque acting around the Z-axis and the torque acting around X-axis generated in the tracking operation and the focusing operation, respectively. Accordingly, the transmission characteristic can be improved.

Figure 12:
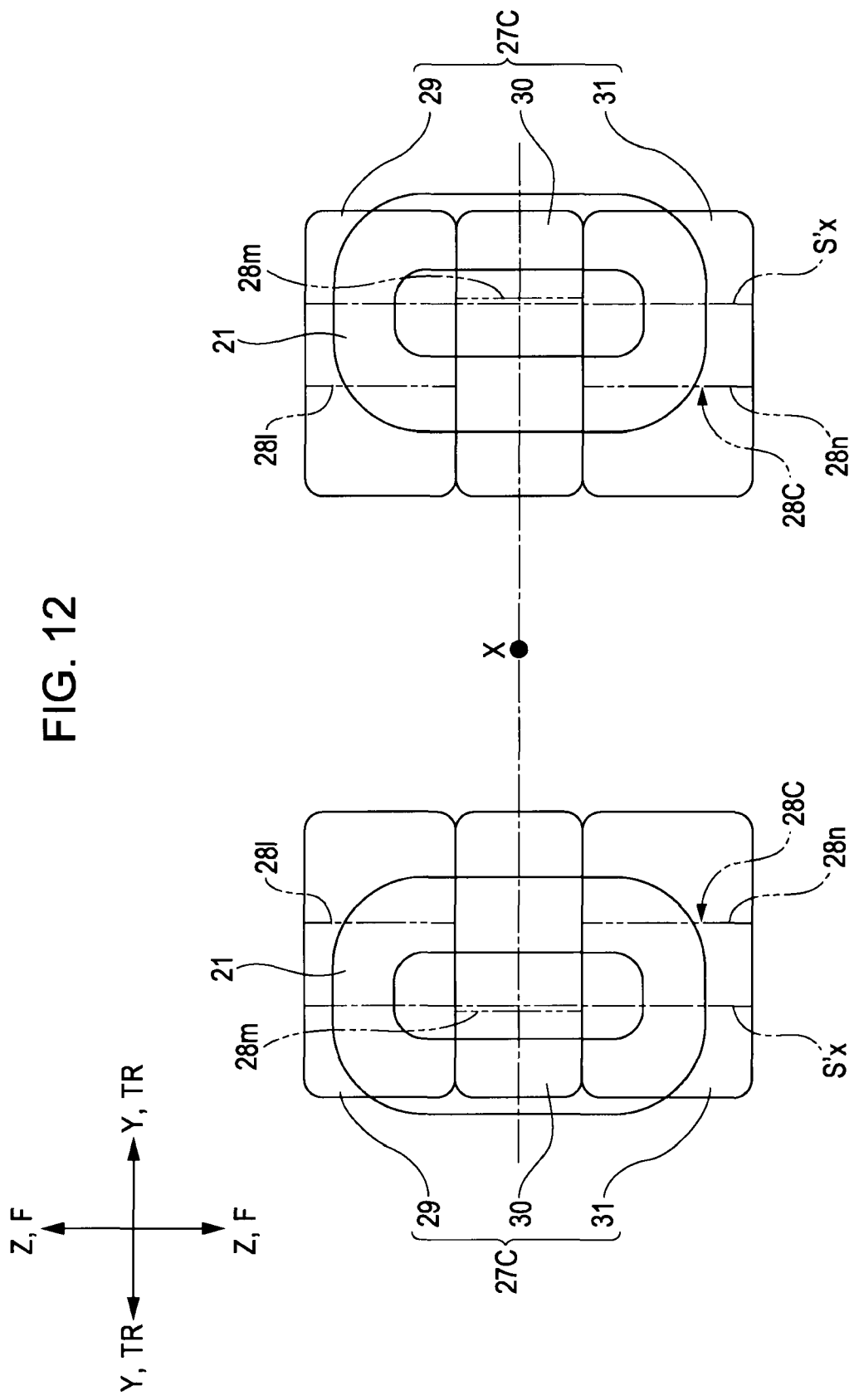
FIG. 12 is an enlarged rear view illustrating tracking magnets according to a third modified example.
Figure 13:
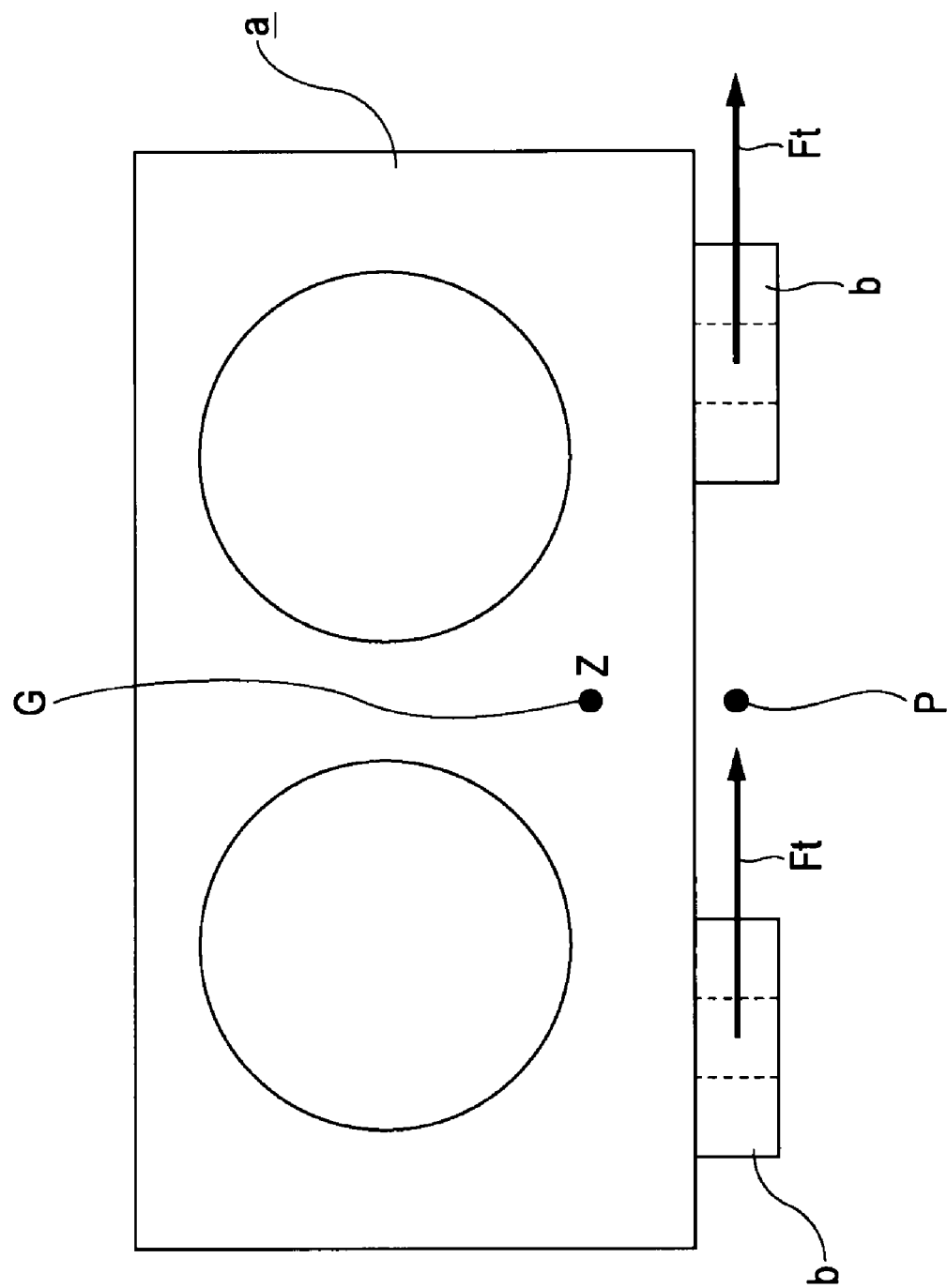
FIG. 13 is a conceptual diagram illustrating an example in which the centroid of a movable block and the point of application of thrust forces generated in a movement in a tracking direction are located at different positions in a related art objective lens drive device.
Figure 14:
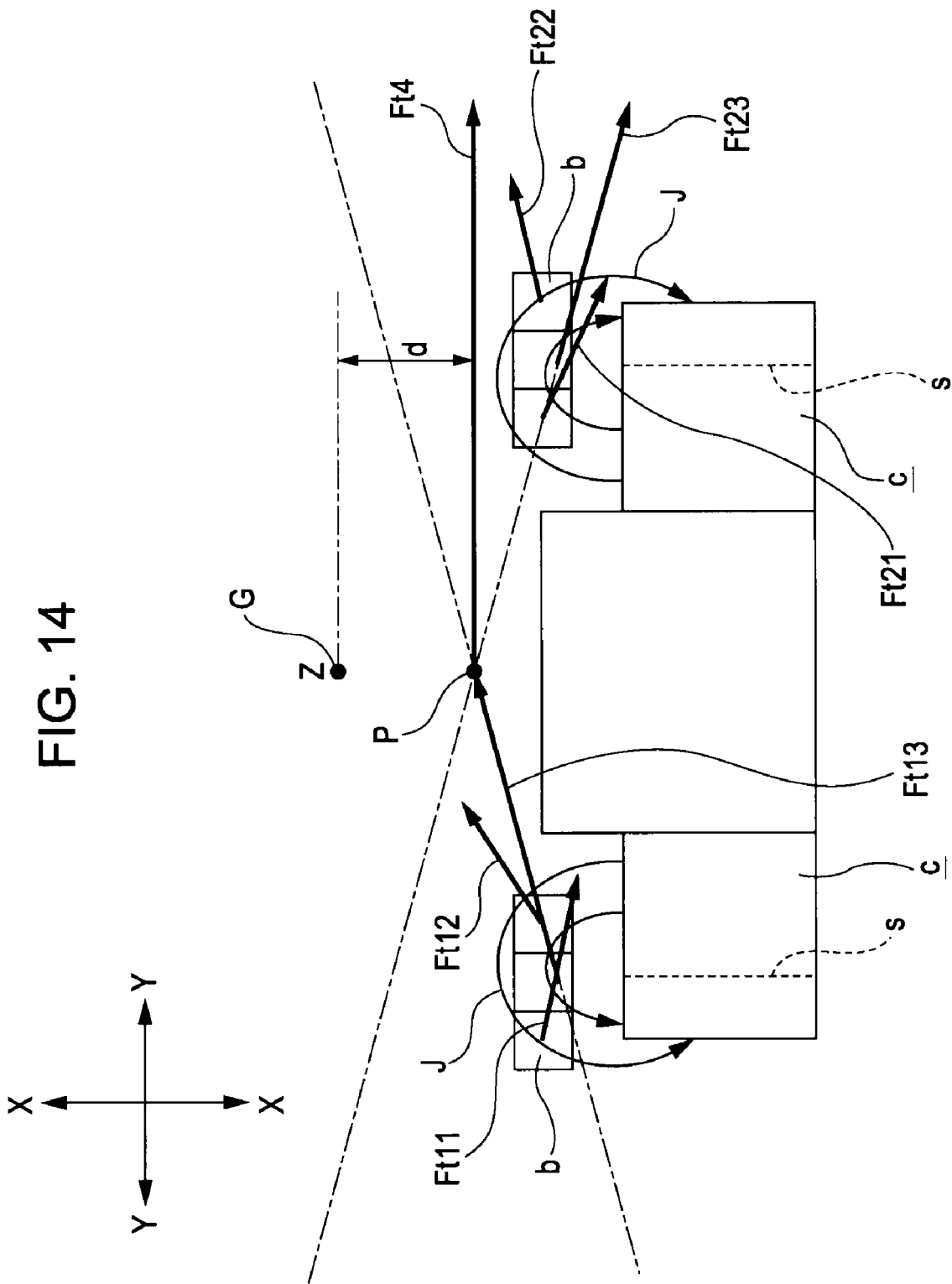
FIG. 14 is a conceptual diagram for explaining the generation of torque acting around a Z-axis.
Figure 15:
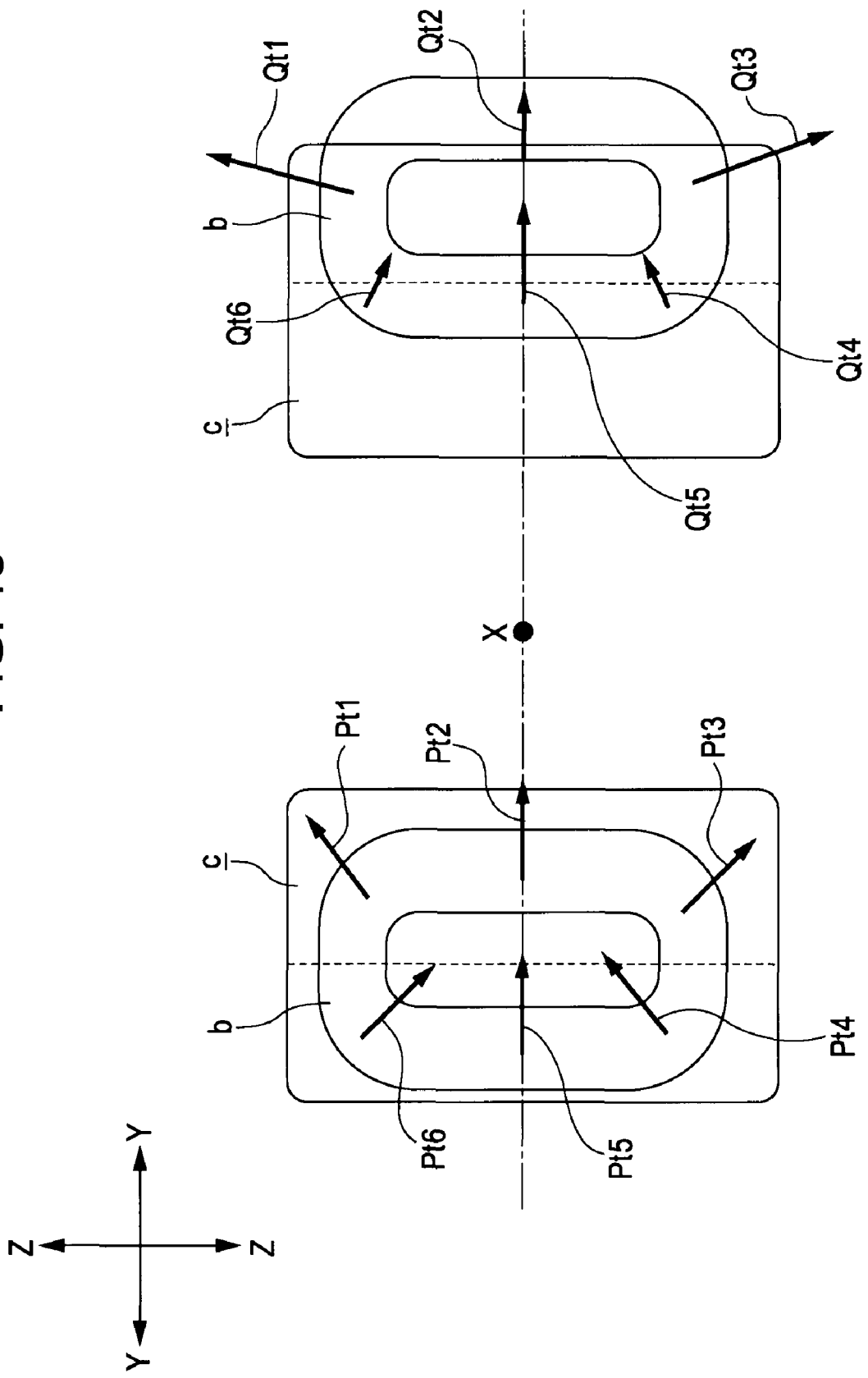
FIG. 15 is a conceptual diagram for explaining, together with FIG. 16, the generation of torque acting around an X-axis, illustrating a state in which the movable block is located at a neutral position in a focusing direction.
Figure 16:
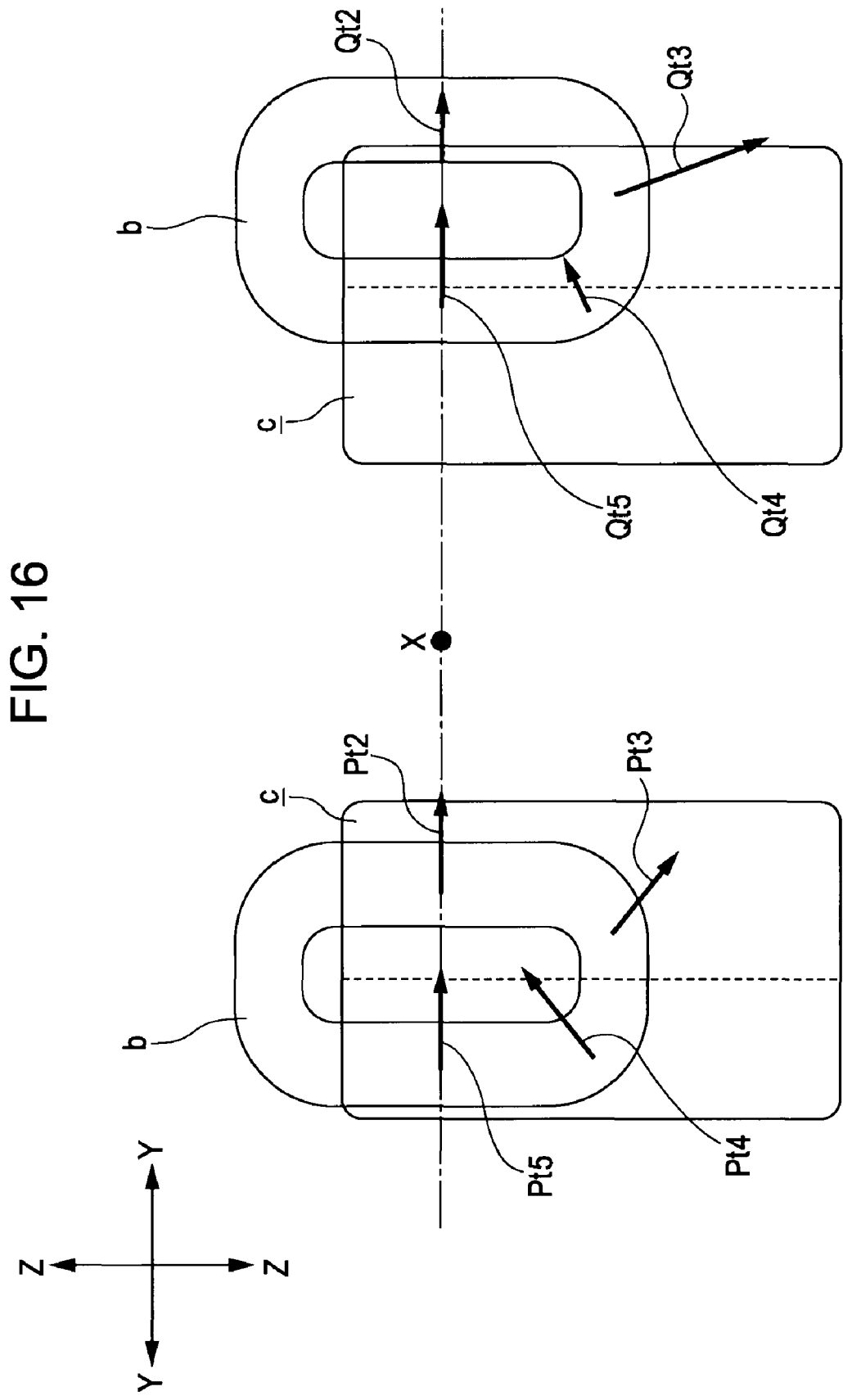
FIG. 16 is a conceptual diagram illustrating a state in which the movable block has been moved in the focusing direction.

Each of tracking magnets 27C according to a third modified example is formed by three members connected in the vertical direction, i.e., an upper magnet 29, a middle magnet 30, and a lower magnet 31 (see FIG. 12).

The tracking magnet 27C has two magnetized poles of north and south poles adjacent to each other in the horizontal direction. The tracking coils 21, the tracking magnets 27C, and the yoke member 25 constitute the tracking magnetic circuit.

The tracking magnet 27C has a boundary 28C formed by three straight line segments. The boundary 28C is formed by a first straight line segment 28l, a second straight line segment 28m, and a third straight line segment 28n, which extend in the vertical direction. The first straight line segment 28l is formed in the upper magnet 29. The second straight line segment 28m is formed in the middle magnet 30. The third straight line segment 28n is formed in the lower magnet 31. The first straight line segment 28l and the third straight line segment 28n are formed at the same position in the horizontal direction. The second straight line segment 28m is formed at an outer position than the first straight line segment 28l and the third straight line segment 28n.

To suppress the toque acting around the X-axis, the position of the second straight line segment 28m of the tracking magnet 27C is set to be located on or in the vicinity of the above-described boundary S'x.

The tracking magnet 27C is formed by the three members, i.e., the upper magnet 29, the middle magnet 30, and the lower magnet 31, which include the first straight line segment 28l, the second straight line segment 28m, and the third straight line segment 28n, respectively. Therefore, the tracking magnet 27C is formed to have a configuration similar to the configuration of the tracking magnet 27B. That is, the first straight line segment 28l corresponds to the first straight line segment 28g, and a part of the boundary between the upper magnet 29 and the middle magnet 30 corresponds to the second straight line segment 28h. Further, the second straight line segment 28m corresponds to the third straight line segment 28i, and a part of the boundary between the middle magnet 30 and the lower magnet 31 corresponds to the fourth straight line segment 28j. Further, the third straight line segment 28n corresponds to the fifth straight line segment 28k.

The tracking magnet 27C is thus formed by the three members of the upper magnet 29, the middle magnet 30, and the lower magnet 31 into the configuration similar to the configuration of the tracking magnet 27B. Therefore, the tracking magnet 27C having the complicated boundary 28c can be easily formed.

In the optical pickup 6, the use of the tracking magnets 27C each having the boundary 28C can suppress both of the unnecessary torques, i.e., the torque acting around the Z-axis and the torque acting around the X-axis generated in the tracking operation and the focusing operation, respectively. Accordingly, the transmission characteristic can be improved.

Further, in the optical lens drive device 8, when each of the tracking magnets 27, 27A, 27B, or 27C is halved by a centerline thereof in the focusing direction, each of the north and south poles of the tracking magnet 27, 27A, 27B, or 27C has a line-symmetric shape with respect to the centerline. In the movement of the movable block 10 in the focusing direction, therefore, the suppressed state of the torque is not changed in accordance with the direction of the movement. Therefore, the unnecessary torque can be suppressed irrespective of the direction of the movement.

The above description has been made of the example in which the boundary in each of the tracking magnets 27, 27A, 27B, or 27C is formed by a plurality of straight line segments. However, a line segment forming the boundary in the tracking magnet is not limited to a straight line, and thus may be a curved line. Therefore, the boundary in the tracking magnet may be any one of the combination of a plurality of straight lines, the combination of a plurality of curved lines, and the combination of a plurality of straight and curved line segments.

Further, the above description has been made of the example in which the two objective lenses 17 and 18 are provided. However, the number of the objective lenses is not limited to two, and thus may be one or a plural number equal to or greater than three.

Further, the above description has been made of the example in which the tilt adjustment is performed when the drive current is supplied to the tilting coils 19. Alternatively, the objective lens drive device 8 may be configured not to include the special tilting magnetic circuit and configured to use the focusing magnetic circuit or the tracking magnetic circuit as the tilting magnetic circuit. For example, if the objective lens drive device 8 is configured to use the focusing magnetic circuit as the tilting magnetic circuit, drive current flowing in the reverse direction is supplied to the first focusing coil 16 and the second focusing coil 20. Thereby, the movable block 10 is moved with respect to the fixed block 9 in the tilting direction TI shown in FIG. 2 to perform the tilt adjustment.

Further, the above description has been made of the example in which the objective lens drive device 8 performs the tilt adjustment as well as the focus adjustment and the tracking adjustment. Alternatively, the objective lens drive device 8 may be configured not to include the tilt adjusting mechanism and configured to perform only the focus adjustment and the tracking adjustment, for example.

In the above description, the focusing direction, the tracking direction, and the tangential direction are referred to as the vertical direction, the horizontal direction, and the anteroposterior direction, respectively. However, these directions are used as examples for convenience of explanation. Thus, the focusing direction, the tracking direction, and the tangential direction are not particularly limited to these directions.

The present application contains subject matter related to that disclosed in Japanese Priority Patent Application JP 2008-150412 filed in the Japan Patent Office on Jun. 9, 2008, the entire content of which is hereby incorporated by reference.

All of the specific shapes and structures of the respective components described in the above preferred embodiments are merely embodiment examples for implementing the present invention. Therefore, the technical scope of the present invention should not be interpreted restrictively by these examples. It should be understood by those skilled in the art that various modifications, combinations, sub-combinations and alterations may occur depending on design requirements and other factors insofar as they are within the scope of the appended claims or the equivalents thereof.

What is claimed is:

1. An optical pickup comprising:
a moving base that moves in a radial direction of a disk-like recording medium mounted on a disk table; and
an objective lens drive device disposed on the moving base and including an objective lens, the objective lens drive device including
a fixed block fixed with respect to the moving base,
a movable block including the objective lens and a lens holder that holds the objective lens, the movable block formed to move with respect to the fixed block at least in a focusing direction approaching or separating from a recording surface of the disk-like recording medium and a tracking direction substantially corresponding to the radial direction of the disk-like recording medium,
a plurality of supporting springs that connect the fixed block and the movable block,
focusing magnets that move the movable block in the focusing direction,
tracking magnets that move the movable block in the tracking direction, each tracking magnet having a north pole and a south pole positioned to be adjacent to each other in the tracking direction and a boundary between the north pole and the south pole being formed other than as a straight line segment and traversing from a first side of the tracking magnet to a second side of the tracking magnet opposing the first side of the tracking magnet,
focusing coils positioned to face the focusing magnets, and
a pair of tracking coils positioned to face the tracking magnets and to be apart from each other in the tracking direction.

2. The optical pickup according to claim 1, wherein, when the tracking magnets are halved by a centerline thereof in the focusing direction, each of the north and south poles of the tracking magnets are a line-symmetrical shape with respect to the centerline.

3. The optical pickup according to claim 1, wherein the tracking magnets are formed by at least two members connected in the focusing direction.

4. The optical pickup according to claim 2, wherein the boundary between the north and south poles of the tracking magnets are formed by two consecutive straight lines tilted with respect to the focusing direction.

5. A disk drive device comprising:
a disk table on which a disk-like recording medium is mounted; and
an optical pickup including a moving base that moves in a radial direction of the disk-like recording medium mounted on the disk table and an objective lens drive device disposed on the moving base and including an objective lens, and configured to apply laser light to the disk-like recording medium mounted on the disk table via the objective lens, the objective lens drive device including
a fixed block fixed with respect to the moving base,
a movable block including the objective lens and a lens holder that holds the objective lens, the movable block formed to move with respect to the fixed block at least in a focusing direction approaching or separating from a recording surface of the disk-like recording medium and a tracking direction substantially corresponding to the radial direction of the disk-like recording medium, a plurality of supporting springs that connect the fixed block and the movable block, focusing magnets that move the movable block in the focusing direction, tracking magnets that move the movable block in the tracking direction, each tracking magnet having a north pole and a south pole positioned to be adjacent to each other in the tracking direction and a boundary between the north pole and the south pole being formed other than as a straight line segment and traversing from a first side of the tracking magnet to a second side of the tracking magnet opposing the first side of the tracking magnet, focusing coils positioned to face the focusing magnets, and a pair of tracking coils positioned to face the tracking magnets and to be apart from each other in the tracking direction.

* * * * *